(12) United States Patent
Izawa

(10) Patent No.: US 11,429,000 B2
(45) Date of Patent: Aug. 30, 2022

(54) ELECTRO-OPTICAL DEVICE AND ELECTRONIC APPARATUS

(71) Applicant: SEIKO EPSON CORPORATION, Tokyo (JP)

(72) Inventor: Shotaro Izawa, Nagoya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/533,917

(22) Filed: Nov. 23, 2021

(65) Prior Publication Data

US 2022/0163856 A1 May 26, 2022

(30) Foreign Application Priority Data

Nov. 24, 2020 (JP) .............................. JP2020-194184

(51) Int. Cl.
*G02F 1/1362* (2006.01)
*G02F 1/1368* (2006.01)
*G02F 1/1333* (2006.01)

(52) U.S. Cl.
CPC ...... *G02F 1/136213* (2013.01); *G02F 1/1368* (2013.01); *G02F 1/133345* (2013.01); *G02F 1/136227* (2013.01); *G02F 1/136286* (2013.01)

(58) Field of Classification Search
None
See application file for complete search history.

(56) References Cited

U.S. PATENT DOCUMENTS

2002/0063823 A1   5/2002  Okuda et al.
2010/0171131 A1*  7/2010  Iki ........................ H01L 27/124
                                                                257/91

FOREIGN PATENT DOCUMENTS

JP    2000-352725 A   12/2000
JP    2004-334064 A   11/2004
JP      2006-78722 A    3/2006
JP    2018-146870 A    9/2018

* cited by examiner

*Primary Examiner* — Richard H Kim
(74) *Attorney, Agent, or Firm* — Oliff PLC

(57) ABSTRACT

A liquid crystal device as an electro-optical device includes, an insulating layer including a first recess and a second recess that is provided continuously with the first recess and is deeper than the first recess, and a capacitance element including, a first capacitance electrode provided along a bottom surface of the second recess and a side wall of the second recess and provided along a bottom surface of the first recess, a capacitance insulating layer stacked on the first capacitance electrode, and a second capacitance electrode stacked on the capacitance insulating layer, wherein an upper surface of the second capacitance electrode at a position overlapping with the second recess, an upper surface of the first capacitance electrode at a position overlapping with the first recess, and a part of the capacitance insulating layer, are provided on the same surface as an upper surface of the insulating layer.

11 Claims, 20 Drawing Sheets

ELECTRO-OPTICAL DEVICE AND ELECTRONIC APPARATUS

The present application is based on, and claims priority from JP Application Serial Number 2020-194184, filed on Nov. 24, 2020, the disclosure of which is hereby incorporated by reference herein in its entirety.

BACKGROUND

1. Technical Field

The present disclosure relates to an electro-optical device and an electronic apparatus.

2. Related Art

There has been known a liquid crystal device that is an active drive type electro-optical device including a transistor as a switching element of a pixel electrode. Such a liquid crystal device includes, for each of a plurality of pixels, a pixel electrode, a transistor that controls the potential of the pixel electrode, and a capacitance element that holds the potential of the pixel electrode. The capacitance element includes a pair of capacitance electrodes arranged with a dielectric film interposed therebetween.

For example, JP-A-2006-78722 discloses a method of manufacturing a liquid crystal display device in which an auxiliary capacitance element composed of five layers is provided in a recess. In addition, for example, JP-A-2004-334064 discloses an electro-optical device in which a storage capacitance is disposed in a layer between a pixel electrode and a thin film transistor (TFT). In these two techniques, a capacitance element is arranged in a light shielded region that is a non-opening region.

However, the liquid crystal display device disclosed in JP-A-2006-78722 and JP-A-2004-334064 have a problem that it is difficult to improve an aperture ratio of the pixel. Specifically, the aperture ratio of the liquid crystal device affects the brightness of an image when the liquid crystal device is used as a light modulation device such as a projector. In order to brighten the image, it is desirable to improve the aperture ratio.

In JP-A-2006-78722, when the capacitance element is formed by a known method, film formation and patterning are repeated for each electrode constituting a storage capacitor as a capacitance element. Therefore, it is necessary to provide a design margin in a planar shape of each pattern in accordance with alignment accuracy or processing accuracy between patterns of each layer so as not to cause a short circuit between electrodes. In addition, in JP-A-2004-334064, after the capacitance electrode is stacked in the recess, patterning is performed after performing CMP (Chemical Mechanical Polishing) treatment. Therefore, it is necessary to give a design margin to the planar shape of the auxiliary capacitance electrode in consideration of processing accuracy in patterning.

Since the electrode of the capacitance element has a light shielding property, the above-described design margin is a factor that hinders improvement of the aperture ratio of the pixel. That is, there has been a demand for an electro-optical device that improves the aperture ratio in a pixel.

SUMMARY

An electro-optical device includes, an insulating layer including a first recess and a second recess that is provided continuously with the first recess and is deeper than the first recess, and a capacitance element including, a first capacitance electrode provided along a bottom surface of the second recess and a side wall of the second recess and provided along a bottom surface of the first recess, a capacitance insulating layer stacked on the first capacitance electrode, and a second capacitance electrode stacked on the capacitance insulating layer, wherein an upper surface of the second capacitance electrode at a position overlapping with the second recess, an upper surface of the first capacitance electrode at a position overlapping with the first recess, and a part of the capacitance insulating layer, are provided on the same surface as an upper surface of the insulating layer.

An electronic apparatus includes the electro-optical device described above.

A method of manufacturing an electro-optical device includes, forming a transistor, forming a first insulating layer on the transistor, forming a first recess in the first insulating layer, forming a second recess deeper than the first recess continuously and integrally with the first recess, covering the first insulating layer, the first recess, and the second recess to form a first conductor layer, covering the first conductor layer to form a second insulating layer, covering the second insulating layer to form a second conductor layer, and performing CMP treatment on the first conductor layer, the second insulating layer, and the second conductor layer to form collectively a capacitance element including a first capacitance electrode, a capacitance insulating layer, and a second capacitance electrode, wherein the depth of the first recess is smaller than the thickness of the first conductor layer, the depth of the second recess is smaller than the total thickness of the first conductor layer, the second insulating layer, and the second conductor layer and larger than the total thickness of the first conductor layer and the second insulating layer.

DESCRIPTION OF EXEMPLARY EMBODIMENTS

In each of the following drawings, XYZ axes are attached as coordinate axes orthogonal to each other as necessary, and a direction indicated by each arrow is defined as a + direction and a direction opposite to the + direction is defined as a − direction. In the following description, the +Z direction may be referred to as upward, and the −Z direction may be referred to as downward, and viewing from the +Z direction is referred to as plan view or planarly.

In the following drawings, the scale of each layer or each member is different from the actual scale so that each layer or each member has a recognizable size. Furthermore, for example, with respect to a substrate, the term "on a substrate" refers to the case where disposed on and in contact with the substrate, the case where disposed above the substrate through other structures, or the case where disposed on the substrate, partly in contact therewith and partly through other structures.

1. First Embodiment 1.1. Liquid Crystal Device

In this embodiment, an active drive type liquid crystal device including a thin film transistor (TFT) is exemplified as an electro-optical device. First, a configuration of a liquid crystal device 100 as an electro-optical device according to this embodiment will be described with reference to FIGS. 1 to 4. FIG. 2 illustrates a cross section along the YZ plane including the line segment H-H' of FIG. 1. In FIG. 2, for convenience of illustration, the size and number of liquid crystals included in the liquid crystal layer are made different from actual ones.

Figure 1:
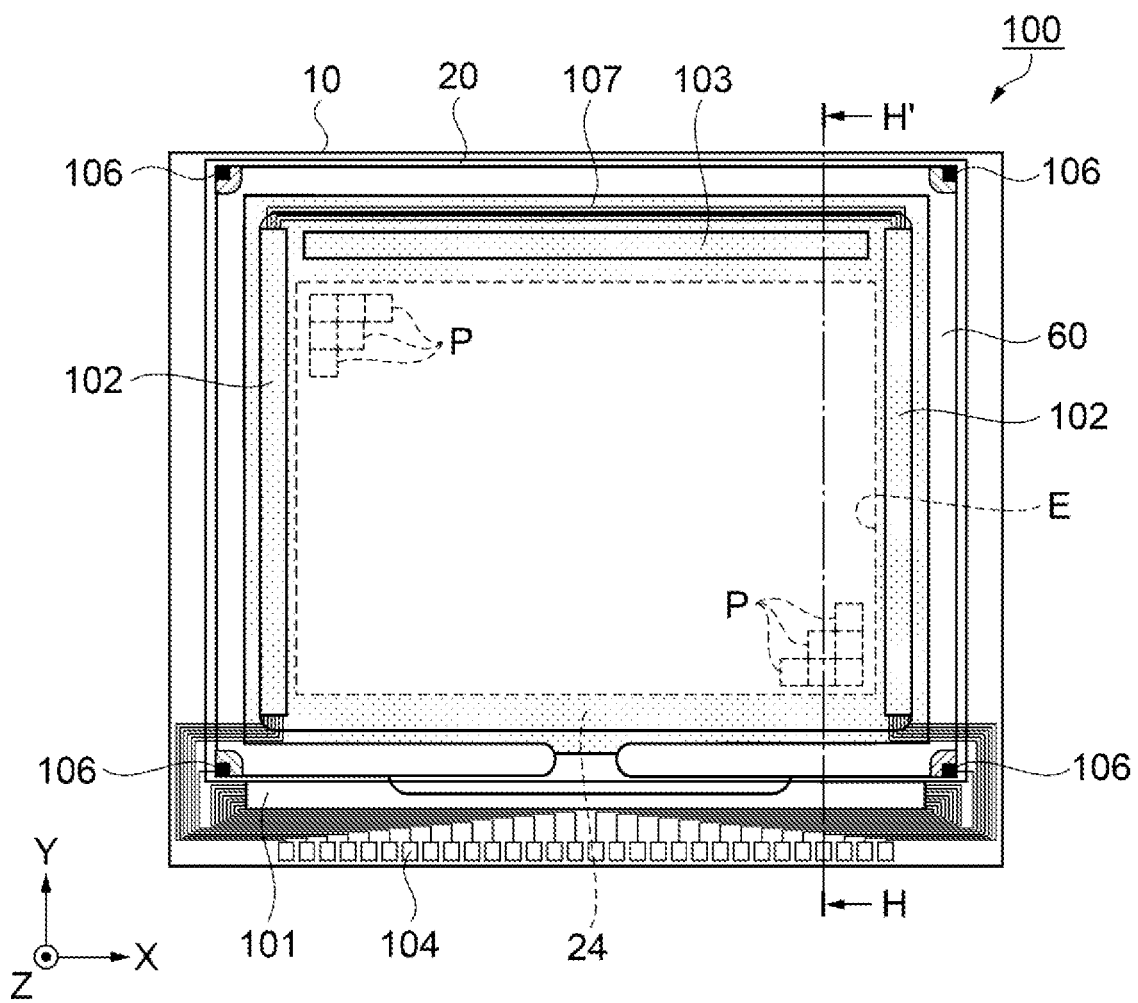
FIG. 1 is a schematic plan view illustrating a configuration of a liquid crystal device according to a first embodiment.
Figure 2:
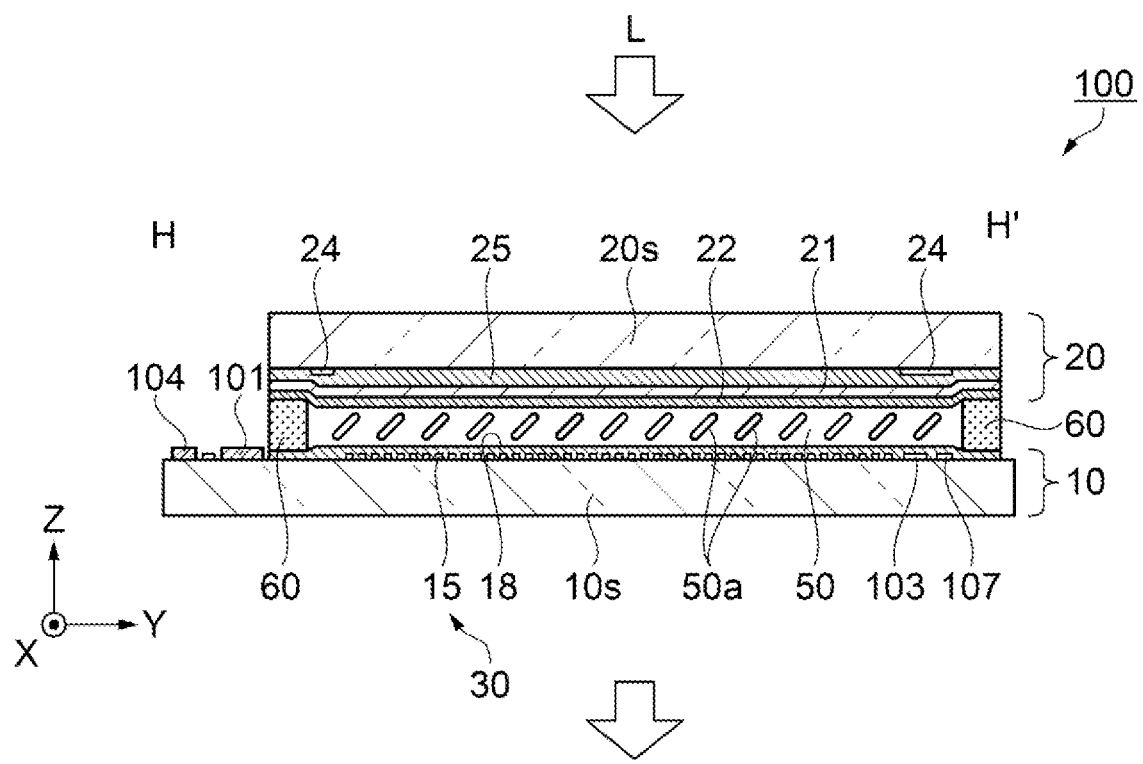
FIG. 2 is a schematic cross-sectional view illustrating a configuration of a liquid crystal device.

As illustrated in FIG. 1, the liquid crystal device 100 according to this embodiment includes an element substrate 10, a counter substrate 20, and a liquid crystal layer described below. The element substrate 10 and the counter substrate 20 have a substantially rectangular shape, and are overlapped and bonded to each other via a seal material 60 disposed along an outer edge of the counter substrate 20. A display region E including a plurality of pixels P arranged in a matrix is provided inside the seal material 60.

The element substrate 10 includes a data line driving circuit 101, two scanning line driving circuits 102, an inspection circuit 103, and a plurality of external connection terminals 104. The element substrate 10 is planarly larger than the counter substrate 20. In the element substrate 10, a plurality of external connection terminals 104 are provided in a region not overlapping with the counter substrate 20, and a data line driving circuit 101 is provided between the plurality of external connection terminals 104 and the seal material 60.

A partition portion 24 surrounding the display region E is provided between the seal material 60 and the display region E. The partition portion 24 has a substantially rectangular shape with two sides along the Y-axis and the other two sides along the X-axis. Each of the above two sides along the Y-axis is arranged with a scanning line driving circuit 102 planarly overlapped. The two scanning line driving circuits 102 are electrically coupled to each other through a wiring 107. Of the above two sides along the X-axis, one side in the +Y direction is arranged with the inspection circuit 103 planarly overlapped. The inspection circuit 103 is electrically coupled to a data line described below.

The data line driving circuit 101 and the two scanning line driving circuits 102 are electrically coupled to the external connection terminals 104. Vertical conduction portions 106 are provided at four corners of the counter substrate 20.

As illustrated in FIG. 2, the element substrate 10 and the counter substrate 20 are arranged to face each other in the direction along the Z-axis. The element substrate 10 and the counter substrate 20 are separated from each other by the seal material 60. The liquid crystal layer 50 is disposed between the element substrate 10 and the counter substrate 20, and is surrounded by these two substrates and the seal material 60. The liquid crystal layer 50 includes a liquid crystal 50a. The liquid crystal 50a has a positive or negative dielectric anisotropy. In this embodiment, a liquid crystal 50a having a negative dielectric anisotropy is employed.

The element substrate 10 includes a substrate 10s as a substrate body, a wiring layer including an TFT 30 as a transistor, a pixel electrode 15, and an alignment film 18, and these components are arranged in this order from the substrate 10s toward the liquid crystal layer 50. The alignment film 18 is disposed between the pixel electrode 15 and the liquid crystal layer 50.

The counter substrate 20 includes a substrate 20s as a substrate body, a partition portion 24, an insulating layer 25, a common electrode 21, and an alignment film 22, and these components are arranged in this order from the substrate 20s toward the liquid crystal layer 50. The alignment film 22 is disposed between the common electrode 21 and the liquid crystal layer 50.

The alignment films 18, 22 are selected based on the optical design of the liquid crystal device 100. Examples of a forming material for the alignment film 18, 22 include an inorganic alignment film such as silicon oxide and an organic alignment film such as polyimide. The alignment films 18 and 22 vertically align the liquid crystal 50a having a negative dielectric anisotropy.

For the substrates 10s and 20s, for example, a flat plate having a transmissive property and an insulating property, such as a glass substrate or a quartz substrate, is adopted. In the present specification, the term "transmissive" means that the transmittance of visible light is 50% or more. The detailed configuration of the element substrate 10 will be described below.

The liquid crystal device 100 is a transmissive type, and light L enters from the counter substrate 20 and exits from the element substrate 10 via the liquid crystal layer 50. When transmitting through the liquid crystal layer 50, the light L is modulated according to the alignment state of the liquid crystal 50a. The incident direction of the light L on the liquid crystal device 100 is not limited to the above, and the light L may be incident from the element substrate 10. In addition, the liquid crystal device 100 is not limited to a transmissive type, and may be a reflective type. The liquid crystal device 100 employs an optical design of a normally white mode or a normally black mode. The liquid crystal device 100 may include polarizing elements on the incident side and the emission side of the light L.

Figure 3:
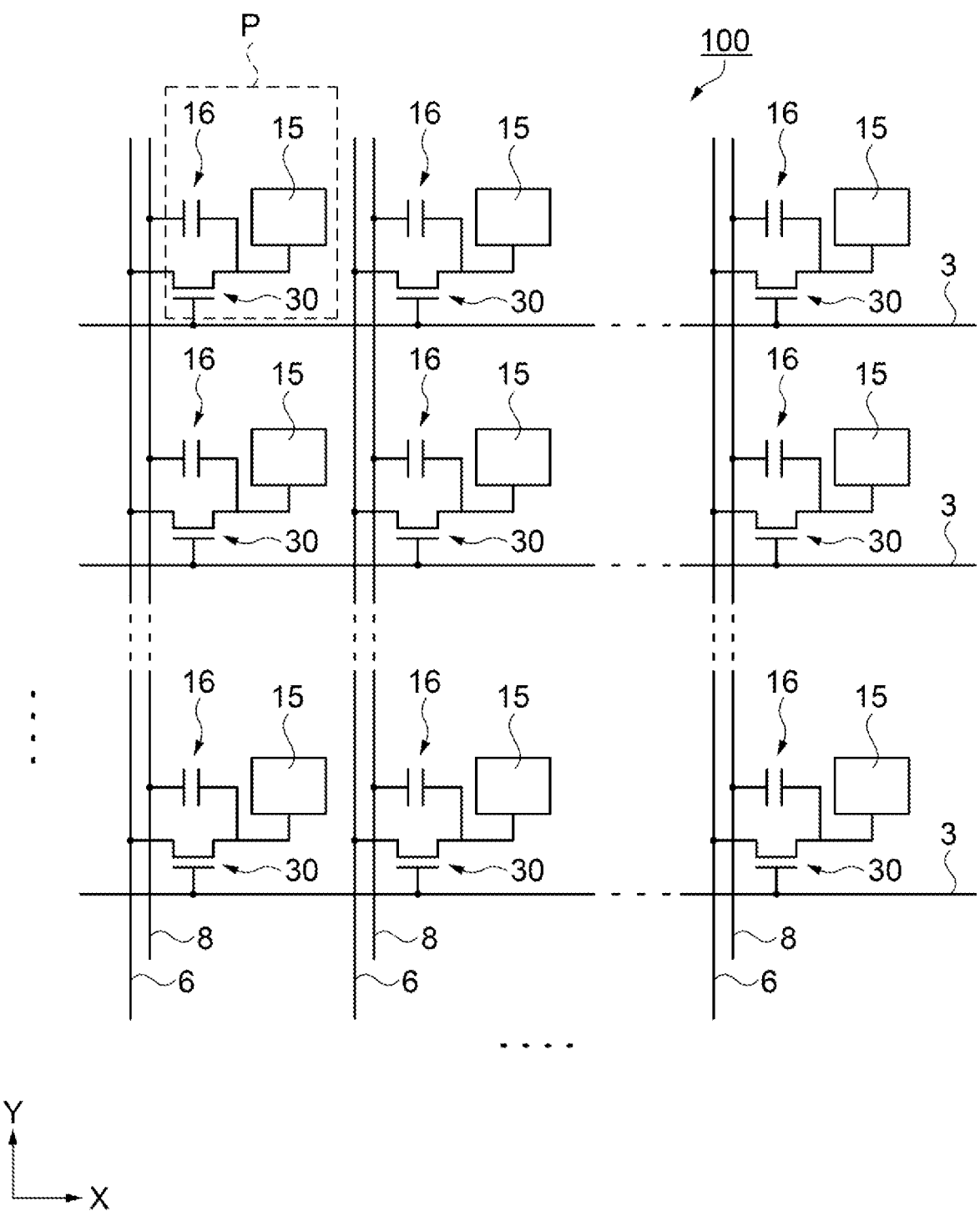
FIG. 3 is an equivalent circuit diagram illustrating an electrical configuration of the liquid crystal device.

As illustrated in FIG. 3, the liquid crystal device 100 includes a plurality of data lines 6, a plurality of scanning lines 3, and a plurality of capacitance lines 8 as signal lines insulated from each other. Among the scanning lines 3, a second scanning line 3b described below extends in a direction along the X-axis, and the data line 6 and the capacitance line 8 extend in a direction along the Y-axis. The capacitance element 16 is electrically coupled to the TFT 30. The capacitance line 8 is not limited to the configuration along the Y-axis, and may be configured along the X-axis.

The pixel electrode 15, the TFT 30, and the capacitance element 16 are provided for each pixel P in a region divided by the scanning line 3, the data line 6, and the capacitance line 8, and constitute a pixel circuit for the pixel P. Signal wirings such as the scanning line 3, the data line 6, and the capacitance line 8 are provided in the wiring layer described above.

The scanning line 3 is electrically coupled to the gate of the TFT 30 that is a switching element. The data line 6 is electrically coupled to the source/drain region on the data line side of the TFT 30. The scanning line 3 simultaneously controls ON/OFF of the TFTs 30 provided in the same row. The pixel electrode 15 is electrically coupled to the source/drain region on the pixel electrode side of the TFT 30.

The data line 6 is electrically coupled to the data line driving circuit 101 described above, and supplies image signal supplied by the data line driving circuit 101 to the pixel P. The image signals may be line-sequentially supplied to each data line 6, or may be supplied to a plurality of adjacent data lines 6 for each group.

The scanning line 3 is electrically coupled to the scanning line driving circuit 102 described above, and supplies scanning signal supplied by the scanning line driving circuit 102 to the pixel P. The scanning signal is line-sequentially supplied to the scanning line 3 in a pulse manner at a predetermined timing.

The TFT 30 is turned on for a predetermined period by the input of the scanning signal, and the image signal is applied to the pixel electrode 15 at a predetermined timing. The image signal is written in the liquid crystal layer 50 at a predetermined level via the pixel electrode 15, and is held for a certain period between the pixel electrode 15 and the common electrode 21 sandwiching the liquid crystal layer 50. At this time, the alignment state of the liquid crystal 50a is changed by the voltage applied according to the image signal. In order to prevent leakage of the held image signal, a capacitance element 16 is electrically coupled in parallel to a liquid crystal capacitance provided between the pixel electrode 15 and the common electrode 21. The capacitance element 16 is provided in a layer between the TFT 30 and the capacitance line 8.

Figure 4:
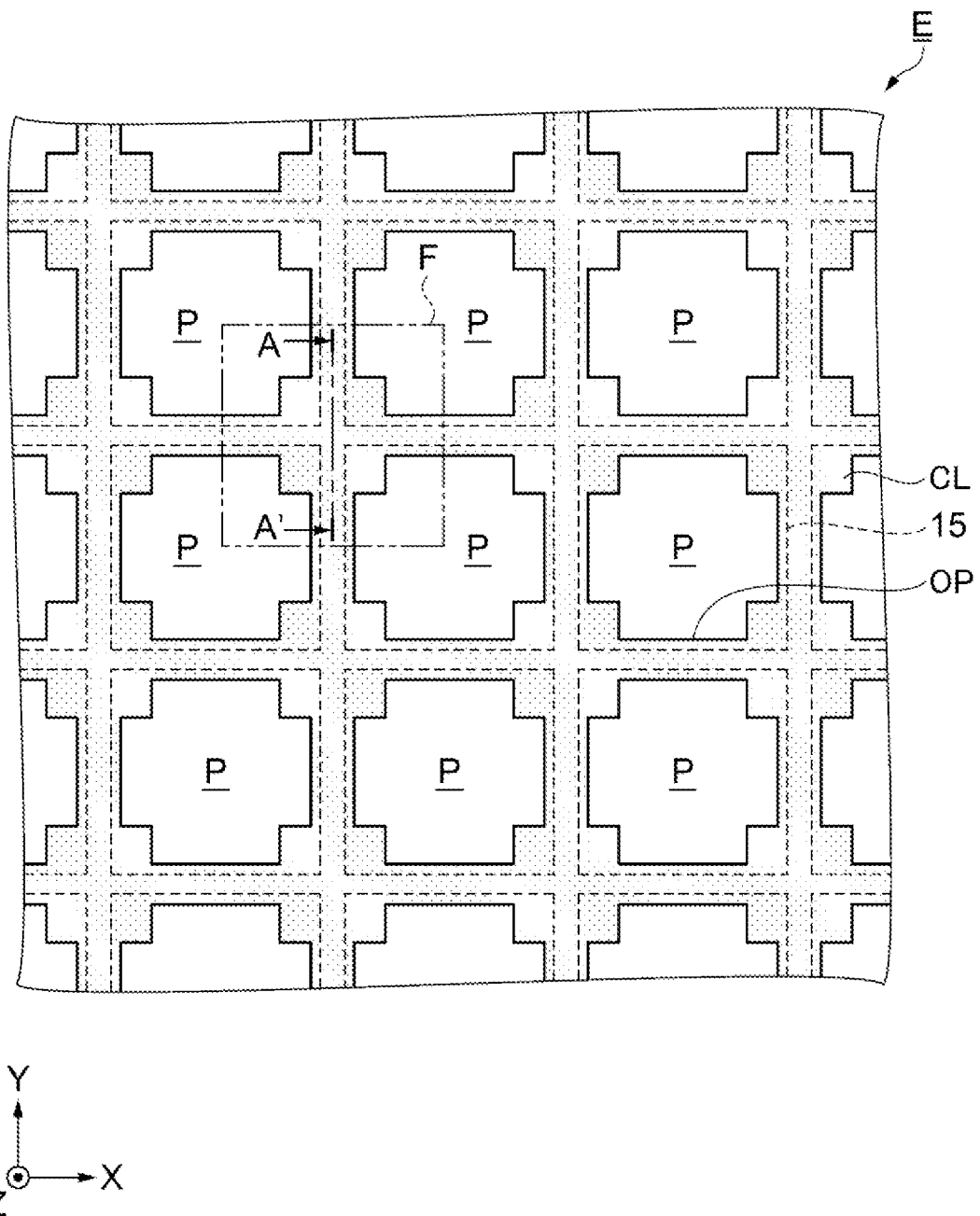
FIG. 4 is a schematic plan view illustrating an arrangement of pixels.

As illustrated in FIG. 4, the pixels P in the liquid crystal device 100 are arranged in a matrix in the direction along the X-axis and the direction along the Y-axis in the display region E. The pixel P has, for example, an opening region OP having a substantially rectangular shape in plan view. The opening region OP extends along the X-axis and the Y-axis, and is surrounded by a light shielding non-opening region CL provided in a lattice shape.

The capacitance element 16 described above is arranged in the non-opening region CL of the pixel P. The second scanning line 3b described above is arranged in the non-opening region CL extending along the X-axis. The data line 6 and the capacitance line 8 described above are disposed in the non-opening region CL extending along the Y-axis. In other words, since a light shielding conductive member is used for the scanning line 3, the data line 6, the capacitance line 8, or the like, the non-opening region CL is formed by the scanning line 3, the data line 6, the capacitance line 8, or the like. The non-opening region CL may include a light shielding portion that is a black matrix provided on the counter substrate 20.

In order to ensure the aperture ratio of the pixel P, the TFT 30, the capacitance element 16, described above, or the like are disposed in the vicinity of the intersection portion of the non-opening region CL, that is, in the region where the data line 6 and the capacitance line 8 intersect the second scanning line 3b in plan view. Since the TFT 30, the capacitance element 16, or the like are disposed, the vicinity of the intersection portion is wider than other portions. Thus, the planar area of the capacitance element 16 can be easily increased, and the capacitance of the capacitance element 16 can be increased. In addition, since the capacitance element 16 having a light shielding property is provided in the above region, the opening region of the pixel P is less likely to be narrowed, so that the aperture ratio can be further improved. Here, the aperture ratio of the pixel P is a ratio of a planar area of the opening region OP to a planar area of the display region E.

A plurality of pixel electrodes 15 are arranged in a matrix corresponding to the plurality of pixels P. The pixel electrode 15 has a substantially square shape in plan view, and is provided in the opening region OP such that an outer edge thereof substantially overlaps with the non-opening region CL.

1.2. Element Substrate

Figure 5:
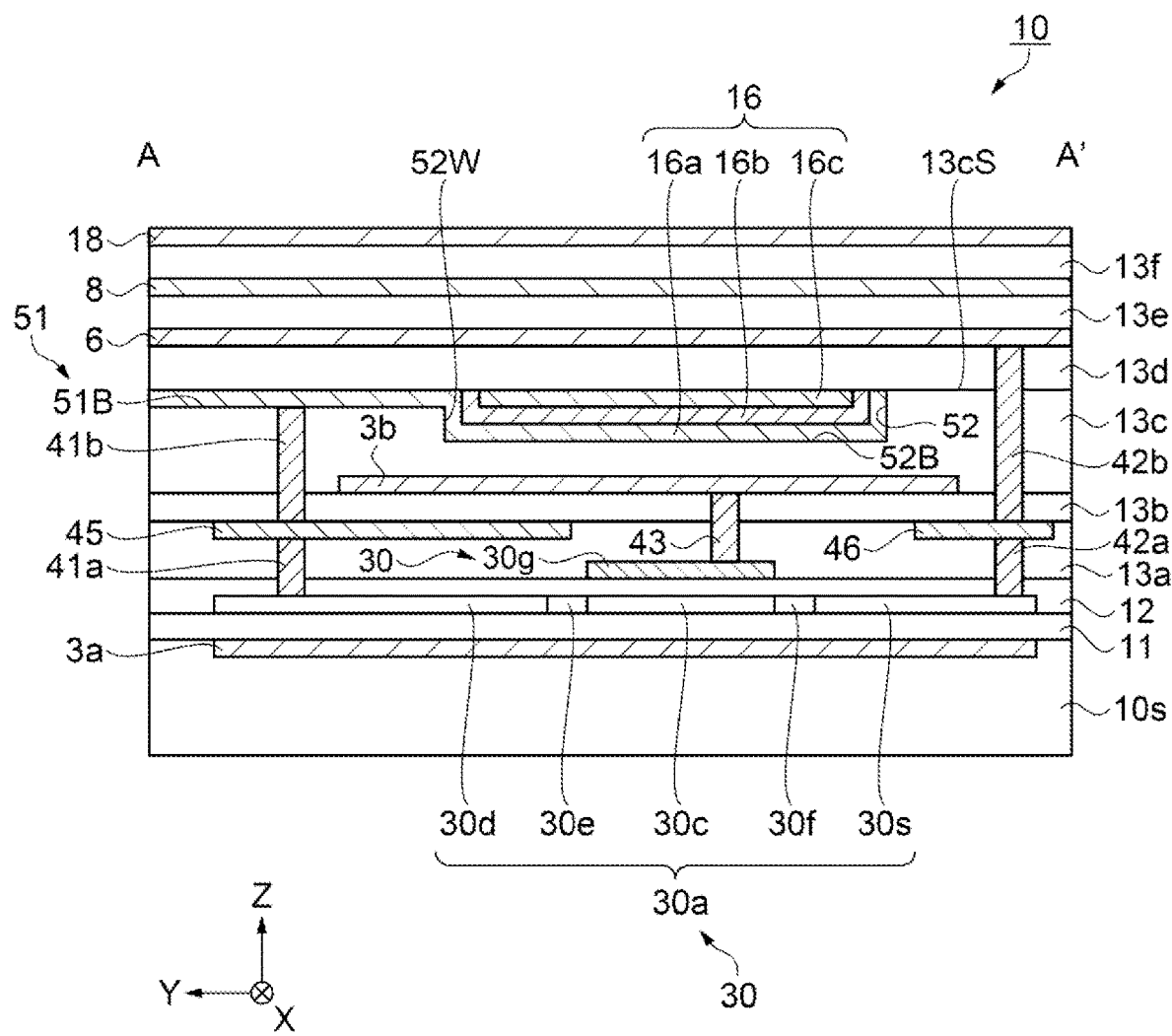
FIG. 5 is an enlarged cross-sectional view illustrating a detailed configuration of an element substrate.

A detailed configuration of the element substrate 10 will be described with reference to FIG. 5. In FIG. 5, in the element substrate 10, a part of a cross section along the YZ plane including the line segment A-A' of FIG. 4 is enlarged.

As illustrated in FIG. 5, a plurality of layers are provided on the substrate 10s. The element substrate 10 includes a substrate 10s, TFT 30, a first scanning line 3a, a second scanning line 3b, a capacitance element 16, a first recess 51, and a second recess 52. The scanning line 3 includes the first scanning line 3a and the second scanning line 3b. The first scanning line 3a and the second scanning line 3b have a light shielding property. The second scanning line 3b is an example of the scanning line of the present disclosure.

The plurality of layers provided in the element substrate 10 include a first layer including the first scanning line 3a, a second layer including a semiconductor layer 30a, a third layer including a gate electrode 30g, a fourth layer including relay electrodes 45, 46, a fifth layer including the second scanning line 3b, a sixth layer including the capacitance element 16, a seventh layer covering the capacitance element 16, an eighth layer including the data line 6, a ninth layer including the capacitance line 8, and a tenth layer including the alignment film 18 and the pixel electrode 15 described above, in this order from the substrate 10s upward.

There are provided an underlying insulating layer 11 between the first and second layers, a gate insulating layer 12 between the second and third layers, an interlayer insulating layer 13a between the third and fourth layers, an interlayer insulating layer 13b between the fourth and fifth layers, an interlayer insulating layer 13c between the fifth and sixth layers, an interlayer insulating layer 13d in the seventh layer, an interlayer insulating layer 13e between the eighth and ninth layers, and an interlayer insulating layer 13f between the ninth and tenth layers. This prevents the occurrence of a short circuit between the layers.

The first scanning line 3a is provided in the first layer on the substrate 10s. The first scanning line 3a is arranged between the semiconductor layer 30a of the TFT 30 and the substrate 10s. The first scanning line 3a is planarly overlapped with the semiconductor layer 30a to form an island shape, and is divided for each pixel P. The first scanning line 3a is electrically coupled to the second scanning line 3b through a contact hole (not illustrated).

Examples of the forming material of the first scanning line 3a include: single metal, alloy, metallic silicide, and polysilicide, which contain one or more kinds of high melting point metals (such as titanium (Ti), chromium (Cr), tungsten (W), tantalum (Ta), and molybdenum (Mo)) having a light shielding property; and single layer or multiple layers of silicon films such as conductive polysilicon or amorphous silicon.

The first scanning line 3a has a function of mainly blocking light incident on the semiconductor layer 30a from below. In this embodiment, tungsten silicide is used for the first scanning line 3a.

An underlying insulating layer 11 is provided between the first scanning line 3a and the second layer. The underlying insulating layer 11 has a function of insulating the first scanning line 3a and the TFT 30 from each other. The underlying insulating layer 11 is formed using, for example, silicon oxide (Non-doped Silicate Glass: NSG) or silicon nitride.

The TFT 30 is disposed in the second layer and the third layer on the first layer. The TFT 30 includes a semiconductor layer 30a provided in the second layer and a gate electrode 30g provided in the third layer. An LDD (Lightly Doped Drain) structure is formed in the semiconductor layer 30a of the TFT 30.

The semiconductor layer 30a extends in the direction along the Y-axis in the second layer. The semiconductor layer 30a includes a channel region 30c, high concentration impurity regions 30d and 30s, and low concentration impurity regions 30e and 30f as LDD regions serving as connection layers.

The gate insulating layer 12 is provided to cover the semiconductor layer 30a. The gate insulating layer 12 is provided between the semiconductor layer 30a and the gate electrode 30g and insulates the semiconductor layer 30a from the gate electrode 30g.

The gate electrode 30g is provided in the third layer so as to face the channel region 30c in the direction along the Z-axis. The gate electrode 30g is formed using, for example, conductive polysilicon, metallic silicide, metal or metal compound. In this embodiment, the gate electrode 30g has a two layer structure of a conductive polysilicon film and a tungsten silicide film. The conductive polysilicon film is formed by depositing a polysilicon film doped with phosphorus (P) by a low-pressure CVD method and then performing phosphorus diffusion treatment so that the polysilicon film contains phosphorus atoms at a concentration of $1 \times 10^{19}/\text{cm}^3$ or more.

In the following description, the conductive polysilicon film refers to a polysilicon film doped with phosphorus atoms to have conductivity. The atoms doped into the polysilicon film are not limited to phosphorus atoms.

An interlayer insulating layer 13a is provided above the gate electrode 30g so as to cover the gate electrode 30g. The interlayer insulating layer 13a is formed by using one or more kinds of silicon-based oxide films such as an NSG film, a PSG (Phospho Silicate Glass) film containing phosphorus (P), a BSG (Boro Silicate Glass) film containing boron (B), and a BPSG (Boro-Phospho Silicate Glass) film containing boron (B) and phosphorus (P).

In the interlayer insulating layer 13a, contact holes 41a, 42a, 43 are provided. The contact hole 41a penetrates the interlayer insulating layer 13a and electrically couples the high concentration impurity region 30d of the semiconductor layer 30a and the relay electrode 45 of the fourth layer. The contact hole 42a penetrates the interlayer insulating layer 13a and electrically couples the high concentration impurity region 30s of the semiconductor layer 30a and the relay electrode 46 of the fourth layer. The contact hole 43 penetrates the interlayer insulating layers 13a and 13b and electrically couples the gate electrode 30g and the second scanning line 3b thereabove.

The relay electrodes 45 and 46 are provided in the fourth layer on the interlayer insulating layer 13a. The relay electrode 45 is disposed so as to substantially overlap with the high concentration impurity region 30d of the semiconductor layer 30a planarly. The relay electrode 46 is disposed so as to overlap with a part of the high concentration impurity region 30s of the semiconductor layer 30a planarly. The relay electrodes 45, 46 employ a forming material similar to the first scanning line 3a.

An interlayer insulating layer 13b is provided above the relay electrodes 45, 46 so as to cover the relay electrodes 45, 46. The interlayer insulating layer 13b employs a forming material similar to that of the interlayer insulating layer 13a.

In the interlayer insulating layer 13b, a tungsten plug 41b, contact holes 42b, 43, or the like are provided. The tungsten plug 41b penetrates through the interlayer insulating layer 13b and an upper layer therefrom, and electrically couples the relay electrode 45 and a lower capacitance electrode 16a that is the first capacitance electrode of the capacitance element 16. The tungsten plug 41b is an example of a first contact hole of the present disclosure. The contact hole 42b penetrates through the interlayer insulating layer 13b and the upper layer therefrom to electrically couples the relay electrode 46 and the data line 6.

The second scanning line 3b is provided in the fifth layer above the interlayer insulating layer 13b. The second scanning line 3b is provided in a layer between the gate electrode 30g and the capacitance element 16. The second scanning line 3b extends in the direction along the X-axis. In addition, the second scanning line 3b has a large width in the +Y direction and the −Y direction in a region overlapping with the semiconductor layer 30a planarly. The second scanning line 3b is electrically coupled to the gate electrode 30g through the contact hole 43. Thus, the first scanning line 3a and the second scanning line 3b are electrically coupled to the gate electrode 30g. The second scanning line 3b employs a forming material similar to that of the first scanning line 3a.

Herein, in this embodiment, a configuration in which the gate electrode 30g and the second scanning line 3b are wired separately has been illustrated, but the present disclosure is not limited thereto. In the element substrate 10, the gate electrode 30g and the second scanning line 3b may be shared, and the second scanning line may also serve as the gate electrode.

An interlayer insulating layer 13c as a first insulating layer is provided above the second scanning line 3b so as to cover the second scanning line 3b. The interlayer insulating layer 13c employs a forming material similar to that of the interlayer insulating layer 13a. The thickness of the interlayer insulating layer 13c is not particularly limited, but is, for example, from 400 nm to 800 nm. In the present specification, the thickness of each wiring and each layer refers to the thickness of the layer constituting the wiring and the layer in the direction along the Z-axis.

The first recess 51, the second recess 52, and the capacitance element 16 are provided in the sixth layer on the interlayer insulating layer 13c. The first recess 51 is planarly disposed so as to overlap with a part of the relay electrode 45 of the lower layer. The second recess 52 is provided integrally with the first recess 51 so as to be continuous with the first recess 51 in the −Y direction of the first recess 51. The second recess 52 is planarly disposed so as to overlap with the channel region 30c, the low concentration impurity regions 30e and 30f and also overlap with a part of the high concentration impurity regions 30d and 30s.

The first recess 51 and the second recess 52 are recesses provided in the interlayer insulating layer 13c as an insulating layer, and the depth of the recess of the second recess 52 is deeper than that of the recess of the first recess 51. This is because, when the first recess 51 and the second recess 52 are formed, after the first recess 51 is formed, a partial region of the first recess 51 is etched downward to form the second recess 52. In the present specification, the depths of the first recess 51, the second recess 52, or the like refer to the distances, upward of the interlayer insulating layer 13c in which the recesses are formed, in the direction along the Z-axis from the planar 13cS described later to the bottoms of the recesses.

The capacitance element 16 is disposed in the second recess 52. The capacitance element 16 is provided so as to fall within the non-opening region CL in plan view. The capacitance element 16 includes a lower capacitance electrode 16a as a first capacitance electrode, a capacitance insulating layer 16b, and an upper capacitance electrode 16c as a second capacitance electrode. The lower capacitance electrode 16a and the upper capacitance electrode 16c overlap with each other via the capacitance insulating layer 16b in the second recess 52.

In the second recess 52, the capacitance element 16 is formed by stacking a lower capacitance electrode 16a, a capacitance insulating layer 16b, and an upper capacitance electrode 16c in this order in the +Z direction. The capacitance element 16 improves the potential retention characteristic of the pixel electrode 15 described above. Since the capacitance element 16 includes a forming material having a light shielding property, the capacitance element 16 also has a function of blocking light incident on the TFT 30 from above.

The lower capacitance electrode 16a is provided continuously from a bottom surface 52B of the second recess 52 to a bottom surface 51B of the first recess 51 via a side wall 52W of the second recess 52. The upper surface of the upper capacitance electrode 16c in the second recess 52, the upper surface of the lower capacitance electrode 16a in the first recess 51, and a part of the capacitance insulating layer 16b are in the same plane. The same surface also includes an upper flat surface 13cS of the interlayer insulating layer 13c excluding the first recess 51 and the second recess 52.

The above form of the capacitance element 16 is derived from covering the interlayer insulating layer 13c including the first recess 51 and the second recess 52, stacking layers to be the lower capacitance electrode 16a, the capacitance insulating layer 16b, and the upper capacitance electrode 16c, and then forming the capacitance element 16 by CMP (Chemical Mechanical Polishing) treatment. A method of forming the first recess 51, the second recess 52, and the capacitance element 16 will be described below.

The lower capacitance electrode 16a has a tungsten plug 41b that is a first contact hole in the first recess 51. Thus, the lower capacitance electrode 16a is electrically coupled to the high concentration impurity region 30d of the semiconductor layer 30a via the tungsten plug 41b, the relay electrode 45, and the contact hole 41a. The tungsten plug 41b is provided in a through hole penetrating the interlayer insulating layers 13b, 13c, and 13d.

A forming materials of the lower capacitance electrode 16a and the upper capacitance electrode 16c are not particularly limited as long as the material has conductivity and a CVD method can be adopted at the time of formation. Specific examples of the forming material include tungsten (W), titanium nitride (TiN), and a conductive polysilicon film. Among these forming materials, the lower capacitance electrode 16a and the upper capacitance electrode 16c are preferably made of tungsten (W). According to this, the light shielding property of the lower capacitance electrode 16a and the upper capacitance electrode 16c is improved, and the incident light to the TFT 30 can be further reduced. Although it is difficult to form tungsten (W) by patterning, tungsten (W) can be easily formed by CMP treatment by providing the capacitance element 16 in the second recess 52, without patterning.

When tungsten (W) is employed for the lower capacitance electrode 16a, an adhesive layer may be disposed between the surface of the lower capacitance electrode 16a in the direction opposite to the +Z direction, that is, the surface below the lower capacitance electrode 16a, and the first recess 51 and the second recess 52. As forming materials for the adhesive layer, titanium nitride, tungsten nitride, or the like are employed. This improves the adhesion between the lower capacitance electrode 16a and the interlayer insulating layer 13d downward therefrom. The thickness of the lower capacitance electrode 16a is not particularly limited, but is, for example, 300 nm.

In the second recess 52, the capacitance insulating layer 16b is provided from above the lower capacitance electrode 16a to the inside of the lower capacitance electrode 16a on the side wall of the second recess 52. The capacitance insulating layer 16b includes a plurality of layers formed using dielectric materials having different dielectric constants. Examples of the dielectric materials include hafnium oxide, aluminum oxide, silicon oxide, silicon nitride, and tantalum oxide, and these are employed in combination. By combining a plurality of layers having different dielectric constants, a larger electric capacity can be secured as compared with a single layer. Note that the capacitance insulating layer 16b is not limited to including a plurality of layers.

In this embodiment, a multilayer film in which hafnium oxide having a high dielectric constant and aluminum oxide having excellent dielectric strength are alternately stacked in this order is used as the capacitance insulating layer 16b. On the upper surface of the capacitance insulating layer 16b, that is, on the surface in contact with the upper capacitance electrode 16c, titanium nitride may be formed as a protective film by sputtering. The thickness of the capacitance insulating layer 16b is not particularly limited, but is, for example, 50 nm.

In the second recess 52, the upper capacitance electrode 16c is provided from above the capacitance insulating layer 16b to the inside of the capacitance insulating layer 16b on the side wall of the second recess 52. The upper capacitance electrode 16c is electrically coupled to the capacitance line 8 in the upper layer via a contact hole 44 or the like as a second contact hole that will be described below. The contact hole 44 is provided in a through hole penetrating the interlayer insulating layers 13d and 13e. Thus, the upper capacitance electrode 16c is electrically coupled to the capacitance line 8 through the contact hole 44 (not illustrated). The thickness of the upper capacitance electrode 16c is not particularly limited, but is, for example, 100 nm.

As a seventh layer over the capacitance element 16, an interlayer insulating layer 13d is provided to cover the capacitance element 16. The interlayer insulating layer 13d employs a forming material similar to that of the interlayer insulating layer 13a.

The data line 6 is provided in the eighth layer on the interlayer insulating layer 13d. The data line 6 extends in the direction along the Y-axis in the non-opening region CL of the pixel P. The data line 6 is electrically coupled to the relay electrode 46 via a contact hole 42b penetrating the interlayer insulating layers 13b, 13c, and 13d. Thus, the data line 6 is electrically coupled to the high concentration impurity region 30s of the semiconductor layer 30a, via the contact hole 42b, the relay electrode 46, and the contact hole 42a.

The forming material of the data line 6 is not particularly limited as long as it is a low resistance wiring material having conductivity, and examples thereof include metals such as aluminum (Al) and titanium (Ti) and metal compounds thereof. In this embodiment, the data line 6 has a four layer structure of Ti (titanium) layer/TiN (titanium nitride) layer/Al (aluminum) layer/TiN (titanium nitride) layer.

An interlayer insulating layer 13e is provided to cover the data line 6. The interlayer insulating layer 13e employs a forming material similar to that of the interlayer insulating layer 13a. In the interlayer insulating layer 13e, unevenness on the surface after the film formation is likely to occur due to a wiring or the like in a lower layer. Therefore, for example, planarization treatment such as CMP treatment may be performed.

The capacitance line 8 is provided in the ninth layer on the interlayer insulating layer 13e. The capacitance line 8 is provided so as to planarly overlap with the data line 6 extending in the direction along the Y-axis. Although not illustrated, the capacitance line 8 is electrically coupled to the vertical conduction portion 106 of the counter substrate 20. Therefore, the same potential as the common potential applied to the common electrode 21 is applied to the capacitance line 8. The capacitance line 8 suppresses the influence of the potential of the data line 6 or the scanning line 3 on the pixel electrode 15.

Although not illustrated in the drawings, the capacitance line 8 has a convex that partially protrudes in the +Y direction planarly relative to the data line 6 in a region overlapping with the second scanning line 3b. The contact hole 44 is electrically coupled to the convex. Thus, the capacitance line 8 is also electrically coupled to the upper capacitance electrode 16c of the capacitance element 16 via the contact hole 44. As a forming material of the capacitance line 8, a low resistance wiring material having conductivity similar to that of the data line 6 is employed.

An interlayer insulating layer 13f is provided to cover the capacitance line 8. The interlayer insulating layer 13f employs a forming material similar to that of the interlayer insulating layer 13a. Also in the interlayer insulating layer 13f, unevenness on the surface after the film formation is likely to occur due to a wiring or the like in a lower layer. Therefore, for example, planarization treatment such as CMP treatment may be performed.

The above-described pixel electrode 15 is provided in the tenth layer on the interlayer insulating layer 13f. The pixel electrode 15 is disposed in an opening region OP not illustrated in FIG. 5. The pixel electrode 15 is formed by forming a transparent conductive film such as ITO (Indium Tin Oxide) or IZO (Indium Zinc Oxide) and then patterning the transparent conductive film. The pixel electrode 15 is electrically coupled to the lower capacitance electrode 16a and the high concentration impurity region 30d of the semiconductor layer 30a, via a contact hole and a relay electrode that are not illustrated.

An alignment film 18 is provided to cover the pixel electrode 15 and the interlayer insulating layer 13f where the pixel electrode 15 is not disposed. In this embodiment, inorganic alignment films are employed as the alignment film 18 of the element substrate 10 and the alignment film 22 of the counter substrate 20. The inorganic alignment film is formed of an aggregate of columns in which an inorganic material such as silicon oxide is deposited from an oblique direction or the like and grown in a columnar shape.

The liquid crystal 50a of the liquid crystal layer 50 has negative dielectric anisotropy with respect to the alignment film 18, 22. Therefore, the liquid crystal 50a is substantially vertically aligned (VA: Vertical Alignment) with a pre-tilt angle θp of 3° to 5° in the column inclination direction with respect to the normal direction of the alignment film surface. By driving the liquid crystal layer 50 by applying an AC voltage (drive signal, AC signal) between the pixel electrode 15 and the common electrode 21, the liquid crystal 50a vibrates so as to tilt in the direction of the electric field generated between the pixel electrode 15 and the common electrode 21.

1.3. Method of Manufacturing Liquid Crystal Device

A method of manufacturing a liquid crystal device as a method of manufacturing an electro-optical device according to this embodiment will be described with reference to FIGS. 6 to 21. In the schematic cross-sectional view, the illustrated region is enlarged with respect to the cross section taken along line A-A' of FIG. 4 illustrated in FIG. 5, and the illustration of the substrate 10s, the first scanning line 3a, the second scanning line 3b, or the like are omitted. In the schematic plan views, the region F illustrated in FIG. 4 is enlarged. In the description of the schematic plan views, a state in plan view is described unless otherwise specified. In the following description, reference is also made to FIG. 5.

The method of manufacturing the liquid crystal device 100 as the electro-optical device of this embodiment includes a method of manufacturing the element substrate 10 described below, and a known technique can be employed except for steps included in the method of manufacturing the element substrate 10. Therefore, in the following description, only a method of manufacturing the element substrate 10 will be described. In the method of manufacturing the element substrate 10, a known technique can be employed unless otherwise specified.

Figure 6:
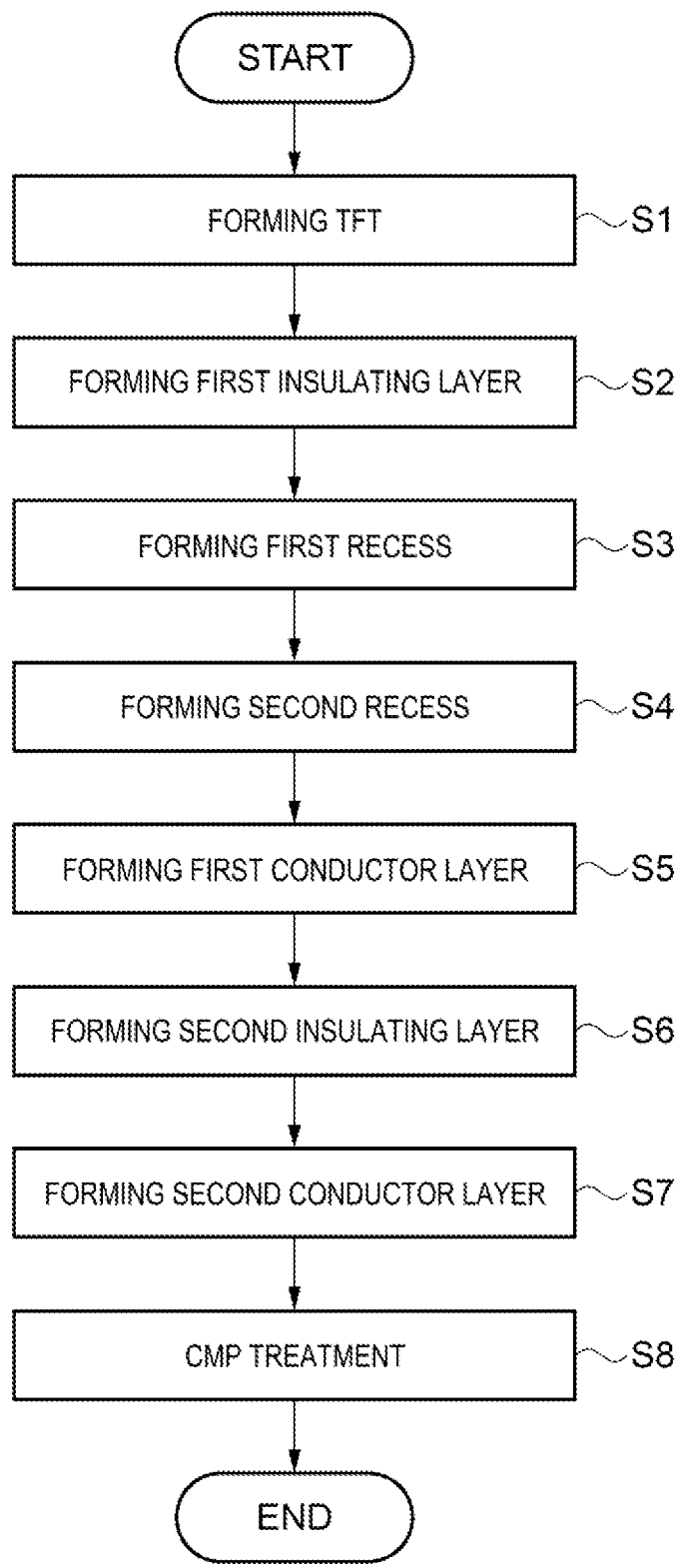
FIG. 6 is a process flow diagram illustrating a method of manufacturing an element substrate in a method of manufacturing a liquid crystal device.

As illustrated in FIG. 6, the method of manufacturing the element substrate 10 of this embodiment includes steps S1 to S8. Hereinafter, each step from the steps S1 to S8 will be described. The process flow of FIG. 6 is an example, and the present disclosure is not limited thereto.

In step S1, the first scanning line 3a, the underlying insulating layer 11, TFT 30, and the second scanning line 3b, or the like are formed on the substrate 10s. First, the first scanning line 3a is formed on the substrate 10s. In order to form the first scanning line 3a, for example, patterning processing by a photolithography method is used.

Next, the underlying insulating layer 11 is formed in a solid state on the first layer including the first scanning line 3a. The underlying insulating layer 11 is formed by, for example, an atmospheric pressure CVD method, a low-pressure CVD method, or a plasma CVD method using a process gas such as monosilane ($SiH_4$), dichlorosilane ($SiCl_2H_2$), TEOS (Tetraethyl Orthosilicate), or ammonia.

Next, a semiconductor layer 30a made of a polysilicon film is formed on the underlying insulating layer 11. In the formation of the semiconductor layer 30a, for example, the amorphous silicon film is crystallized by performing high temperature treatment at 550° C. or higher. The semiconductor layer 30a is made of, for example, a polysilicon film obtained by crystallizing an amorphous silicon film deposited by a low-pressure CVD method or the like. For this purpose, the amorphous silicon film is subjected to high temperature treatment at, for example, 1000° C. or higher to be crystallized. Impurity ions are selectively injected into the polysilicon film to form a channel region 30c, high concentration impurity regions 30d and 30s, and low concentration impurity regions 30e and 30f as LDD regions serving as connection layers.

Then, the second layer including the semiconductor layer 30a is covered to form the gate insulating layer 12. In the case where the gate insulating layer 12 employs a double structure including two kinds of silicon oxides, for example, a first silicon oxide film obtained by thermally oxidizing a silicon semiconductor film is formed, and then a second silicon oxide film is formed by a low-pressure CVD method under a high-temperature condition of 700° C. to 900° C.

Next, a pair of through holes penetrating through the underlying insulating layer 11 and the gate insulating layer 12 are formed at positions planarly overlapping with the first scanning line 3a, with the semiconductor layer 30a interposed therebetween in the direction along the X-axis. The pair of through holes can be formed by, for example, dry etching. The pair of through holes serves as a pair of contact holes that electrically couple the first scanning line 3a and the gate electrode 30g when the gate electrode 30g is formed.

Next, the gate electrode 30g is formed on the gate insulating layer 12. The gate electrode 30g is disposed so as to planarly overlap with the channel region 30c of the semiconductor layer 30a. Thus, TFT 30 is formed including the semiconductor layer 30a and the gate electrode 30g.

Then, the gate electrode 30g is covered to form the interlayer insulating layer 13a above the gate electrode 30g. Examples of methods of forming the silicon-based oxide film serving as the interlayer insulating layer 13a include atmospheric pressure CVD method, low-pressure CVD method, and plasma CVD method using monosilane, dichlorosilane, TEOS, TEB (Triethyl Borate), or the like. Note that unevenness occurs on the surface of the interlayer insulating layer 13a by covering the TFT 30 including the gate electrode 30g. Therefore, planarization treatment such as CMP treatment may be performed for the purpose of improving patterning property of electrodes, wirings, or the like to be formed later.

Next, through holes for providing contact holes 41a and 42a are formed in the interlayer insulating layer 13a. The contact holes formed in the element substrate 10 including the contact holes 41a, 42a, and 43 are formed by, for example, dry-etching an interlayer insulating layer to form through holes, and then filling the through holes together with conductive signal wirings electrically coupled in an upper layer.

Next, the relay electrodes 45, 46 or the like are formed in the fourth layer on the interlayer insulating layer 13a. The relay electrodes 45, 46 are formed in the same manner as the first scanning line 3a.

Above the relay electrodes 45, 46, the relay electrodes 45, 46 are covered to form the interlayer insulating layer 13b. The interlayer insulating layer 13b is formed in the same manner as the interlayer insulating layer 13a.

Next, through holes to be the tungsten plug 41b, the contact hole 42b, 43, or the like are formed in the interlayer insulating layer 13b.

Next, the second scanning line 3b is formed in the fifth layer on the interlayer insulating layer 13b. The second scanning line 3b is formed in the same manner as the first scanning line 3a. Then, the process proceeds to step S2.

In the step S2, above the TFT 30, the second scanning line 3b is covered to form the interlayer insulating layer 13c as the first insulating layer. The interlayer insulating layer 13c is formed in the same manner as the interlayer insulating layer 13a. Then, the process proceeds to step S3.

Figure 7:
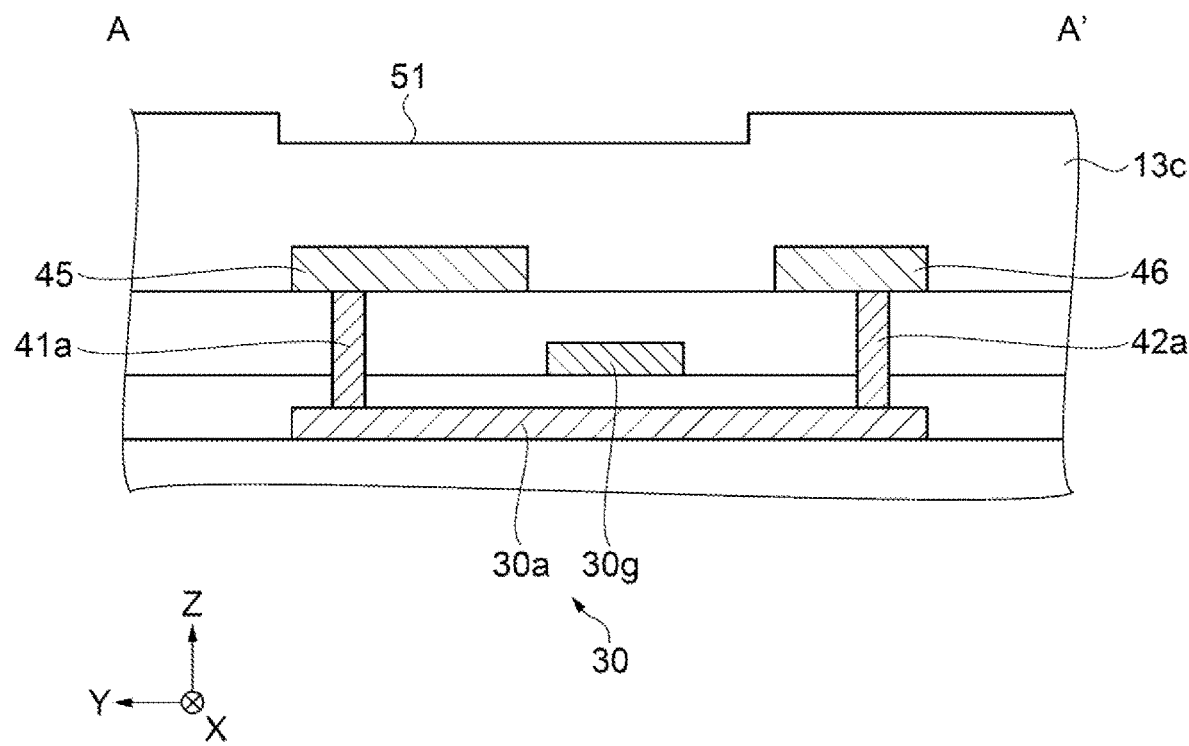
FIG. 7 is a schematic cross-sectional view illustrating a method of manufacturing an element substrate.
Figure 8:
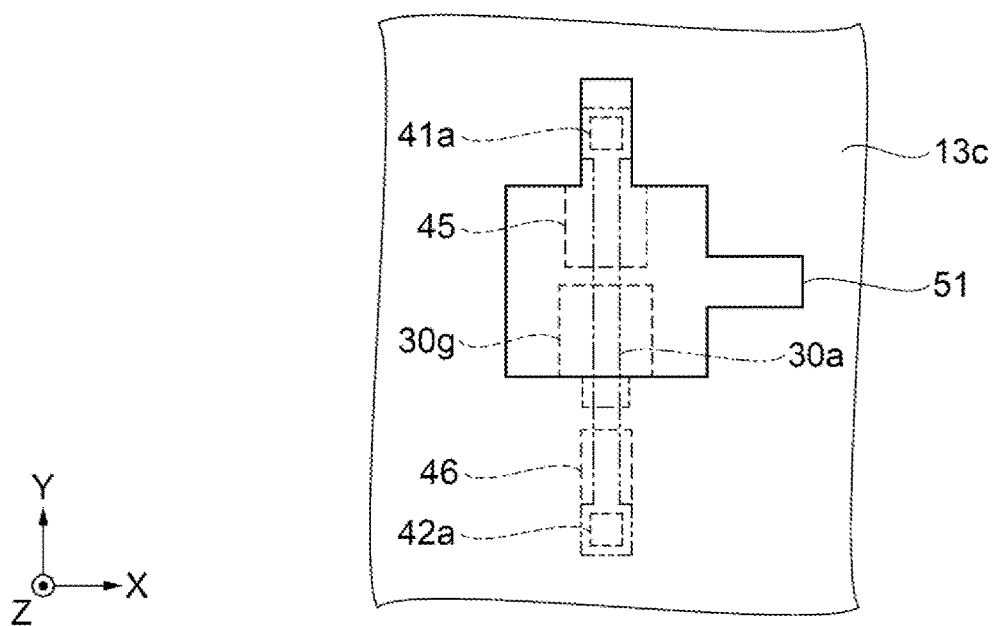
FIG. 8 is a schematic plan view illustrating a method of manufacturing an element substrate.

In the step S3, as illustrated in FIG. 7, the first recess 51 is formed in the interlayer insulating layer 13c. As illustrated in FIG. 8, a part of the first recess 51 protrudes in the +Y direction and the +X direction from a rectangular region overlapping with the intersection of the non-opening region CL described above. The contact hole 41a is electrically coupled to the region protruding in the +Y direction. A contact hole 48 described below is electrically coupled to the region protruding in the +X direction. The first recess 51 is formed by a combination of photolithography method and oxide film etching. The depth of the first recess 51 is smaller than the thickness of the interlayer insulating layer 13c, and is not particularly limited, but is, for example, from 100 nm to 300 nm. Then, the process proceeds to step S4.

Figure 9:
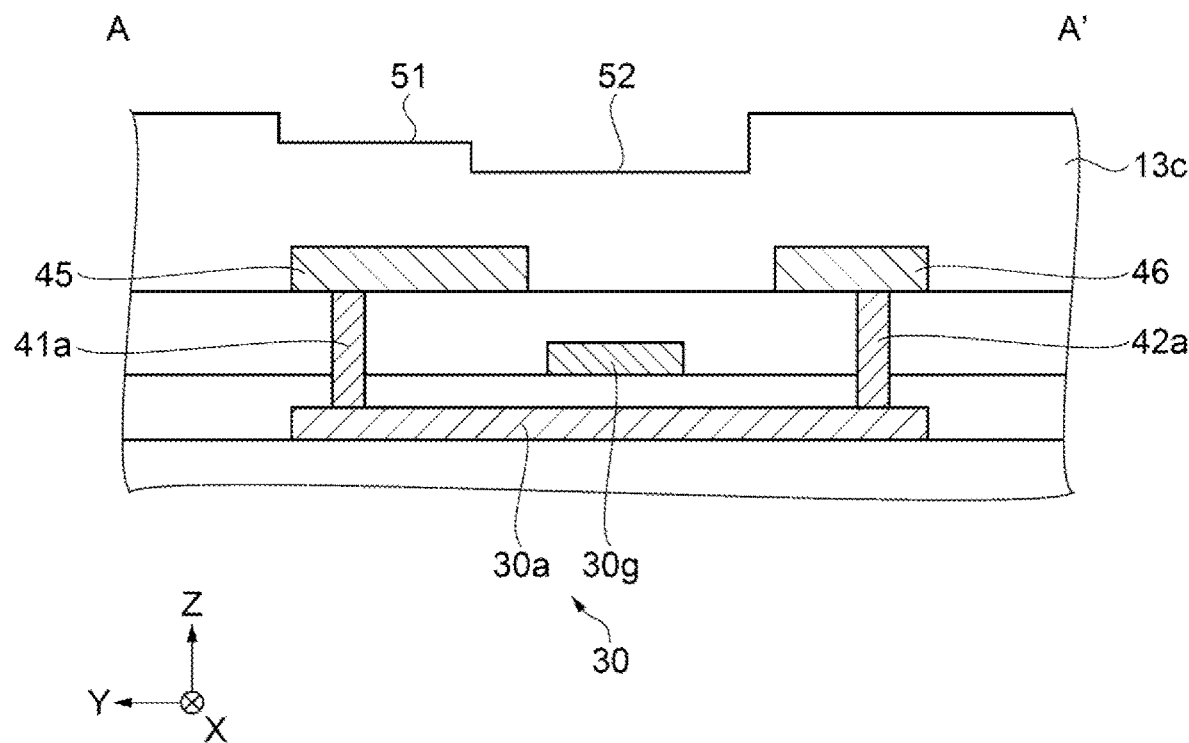
FIG. 9 is a schematic cross-sectional view illustrating a method of manufacturing an element substrate.

In the step S4, as illustrated in FIG. 9, the second recess 52 is formed continuously and integrally with the first recess 51. The second recess 52 is formed in the same manner as the first recess 51. The second recess 52 is deeper than the first recess 51. The depth of the second recess 52, that is, the depth from the upper surface of the interlayer insulating layer 13c to the bottom of the second recess 52 is not particularly limited, but is, for example, from 300 nm to 500 nm.

Figure 10:
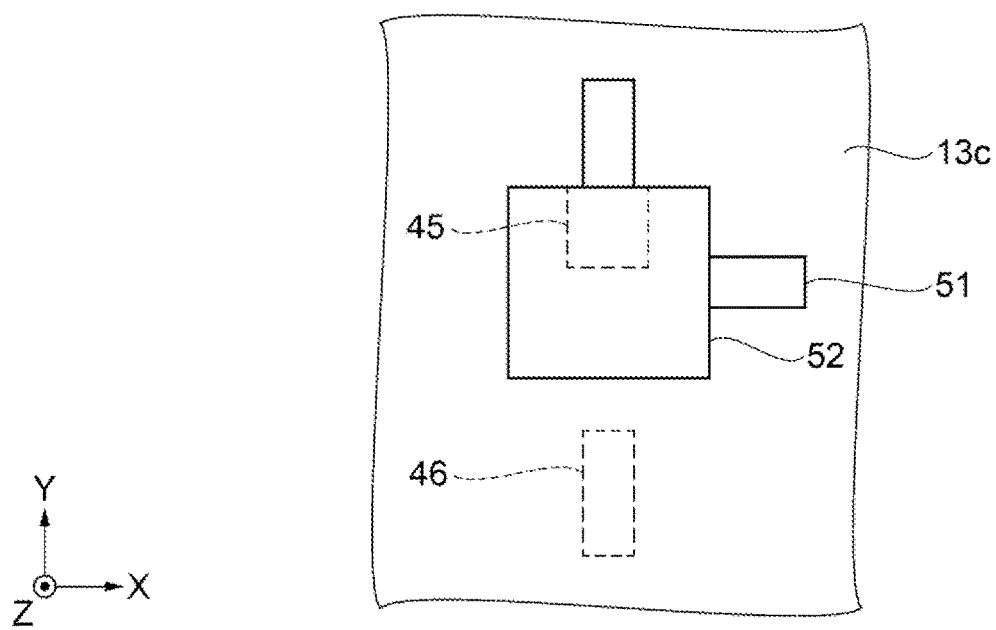
FIG. 10 is a schematic plan view illustrating a method of manufacturing an element substrate.

As illustrated in FIG. 10, the second recess 52 is substantially rectangular. The second recess 52 overlaps with the above rectangular region of the first recess 51. When the second recess 52 is formed, the rectangular region of the first recess 51 becomes the second recess 52, and the region protruding in the +Y direction and the +X direction of the first recess 51 remains as the first recess 51. In other words, the first recess 51, which is one step shallower than the second recess 52, is disposed to protrude from the second recess 52 in the +Y direction and the +X direction.

Figure 11:
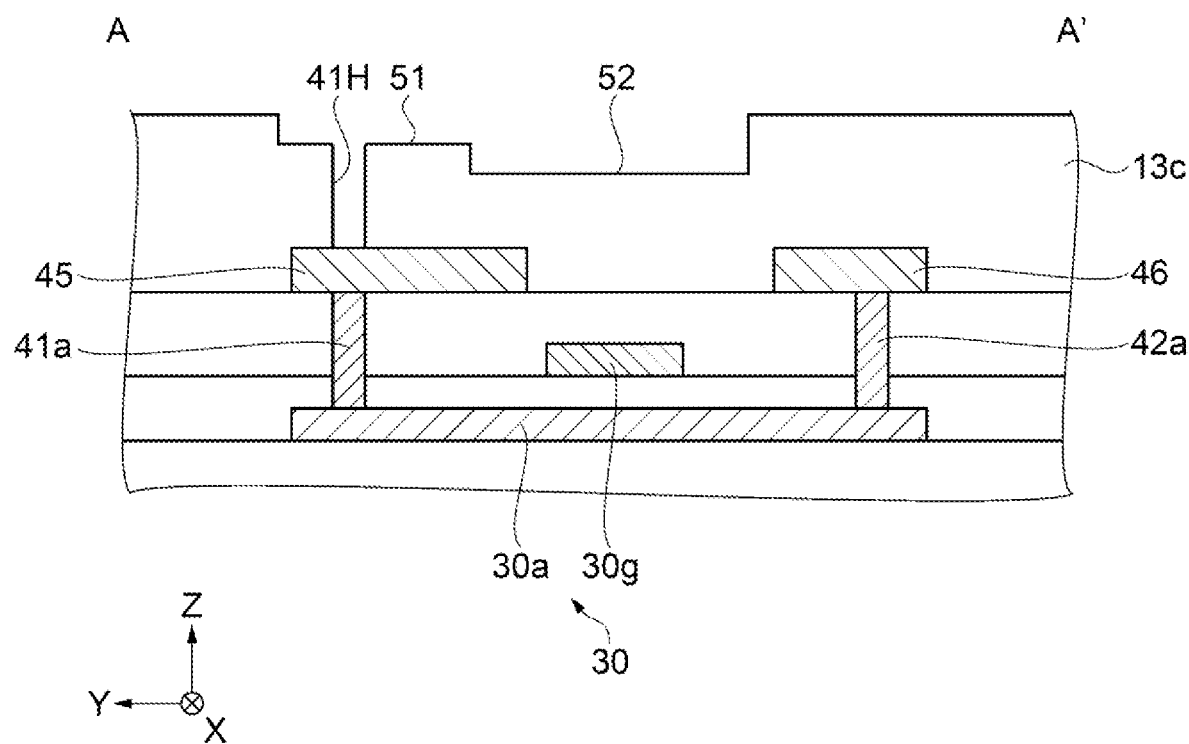
FIG. 11 is a schematic cross-sectional view illustrating a method of manufacturing an element substrate.
Figure 12:
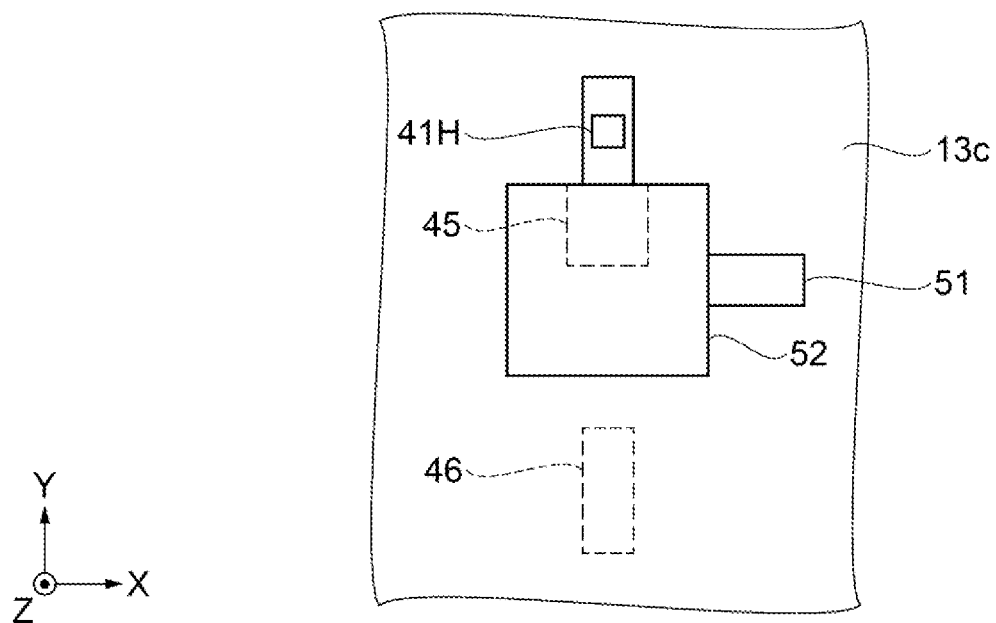
FIG. 12 is a schematic plan view illustrating a method of manufacturing an element substrate.

Next, as illustrated in FIGS. 11 and 12, a through hole 41H penetrating through the lower interlayer insulating layer is formed in a region protruding in the +Y direction of the first recess 51. The through hole 41h exposes the relay electrode 45 upward. Then, the process proceeds to step S5.

Figure 13:
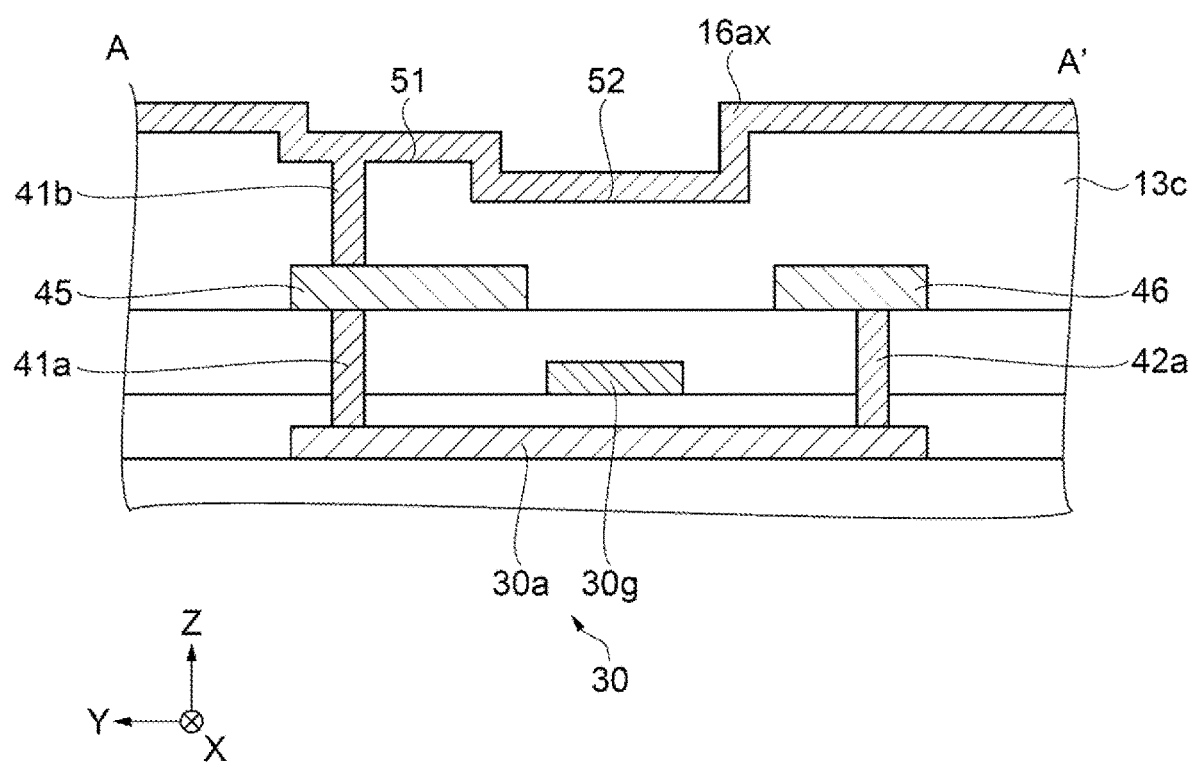
FIG. 13 is a schematic cross-sectional view illustrating a method of manufacturing an element substrate.

In the step S5, as illustrated in FIG. 13, the interlayer insulating layer 13c, first recess 51, and the second recess 52 is covered to form the first conductor layer 16ax. A part of the first conductor layer 16ax becomes the lower capacitance electrode 16a of the capacitance element 16. The thickness of the first conductor layer 16ax is not particularly limited, but is, for example, from 200 nm to 400 nm. At this time, the tungsten plug 41b is also formed in the through hole 41H as well. The first conductor layer 16ax is made of tungsten (W) and is formed by a CVD method using tungsten hexafluoride as a raw material gas. Then, the process proceeds to step S6.

Figure 14:
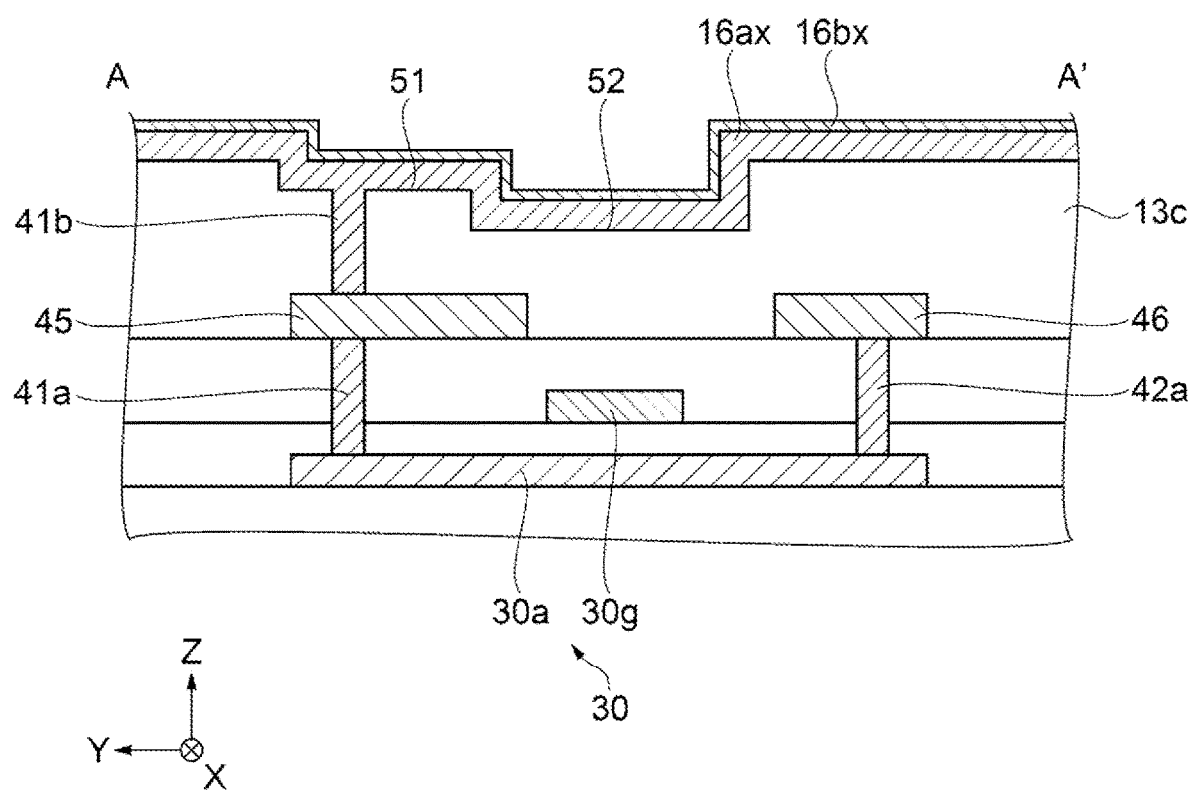
FIG. 14 is a schematic cross-sectional view illustrating a method of manufacturing an element substrate.

In the step S6, as illustrated in FIG. 14, the first conductor layer 16ax is covered to form the second insulating layer 16bx. A part of the second insulating layer 16bx becomes the capacitance insulating layer 16b of the capacitance element 16. The thickness of the second insulating layer 16bx is not particularly limited, but is, for example, from 10 nm to 40 nm. The second insulating layer 16bx is formed by an ALD (Atomic Layer Deposition) method. Then, the process proceeds to step S7.

Figure 15:
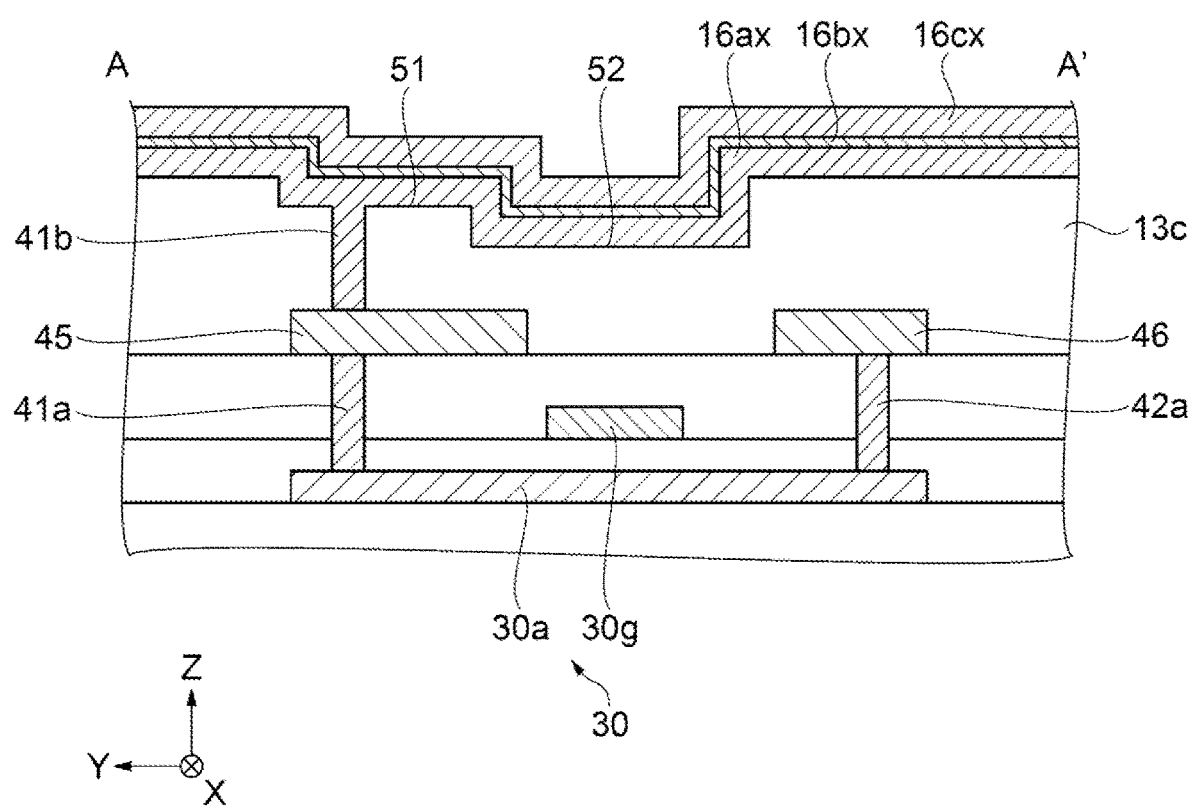
FIG. 15 is a schematic cross-sectional view illustrating a method of manufacturing an element substrate.

In the step S7, as illustrated in FIG. 15, the second insulating layer 16bx is covered to form the second conductor layer 16cx. A part of the second conductor layer 16cx becomes the upper capacitance electrode 16c of the capacitance element 16. The thickness of the second conductor layer 16cx is not particularly limited, but is, for example, from 100 nm to 400 nm. The second conductor layer 16cx is formed in the same manner as the first conductor layer 16ax.

The depth of the second recess 52 is smaller than the total of the thicknesses of the first conductor layer 16ax, the second insulating layer 16bx, and the second conductor layer 16cx and larger than the total of the thicknesses of the first conductor layer 16ax and the second insulating layer 16bx. Accordingly, when the capacitance element 16 is formed, the first conductor layer 16ax serving as the lower capacitance electrode 16a, the second insulating layer 16bx serving as the capacitance insulating layer 16b, and the second conductor layer 16cx serving as the upper capacitance electrode 16c are stacked in the first recess 51 and the second recess 52, and then the capacitance element 16 can be easily formed collectively by performing the CMP treatment. Then, the process proceeds to step S8.

Figure 16:
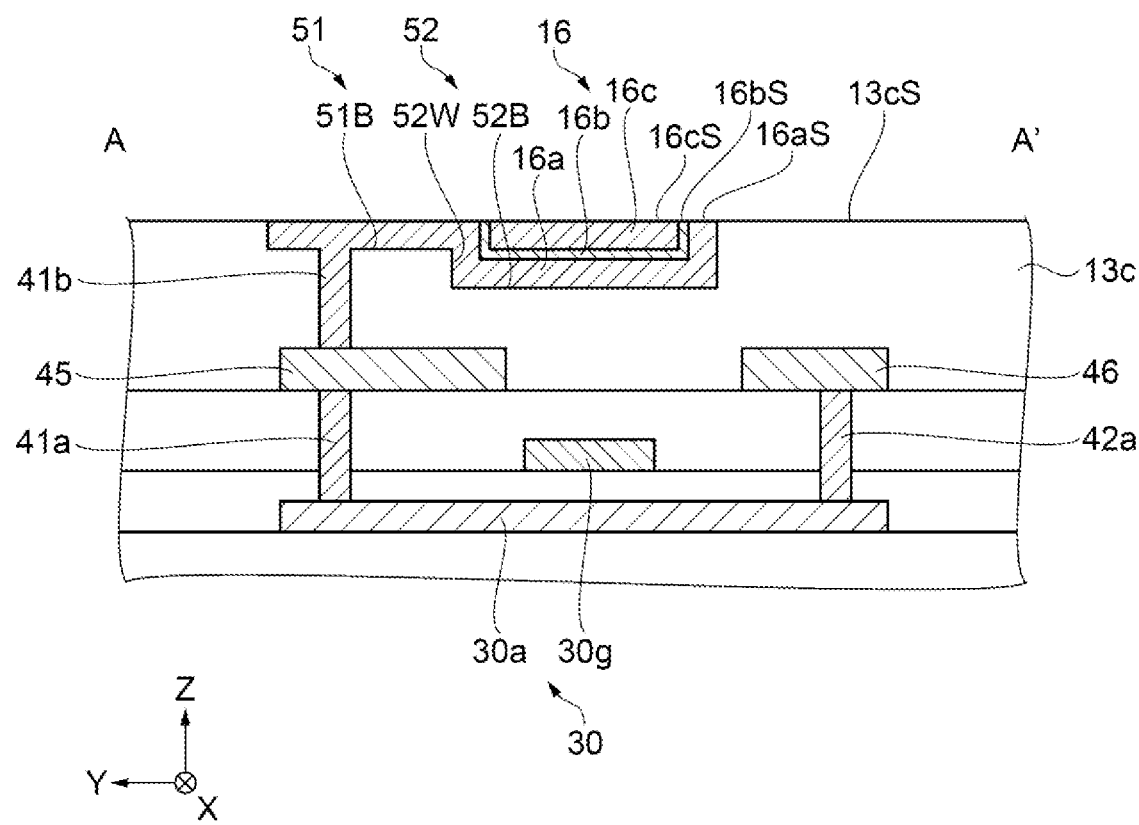
FIG. 16 is a schematic cross-sectional view illustrating a method of manufacturing an element substrate.
Figure 17:
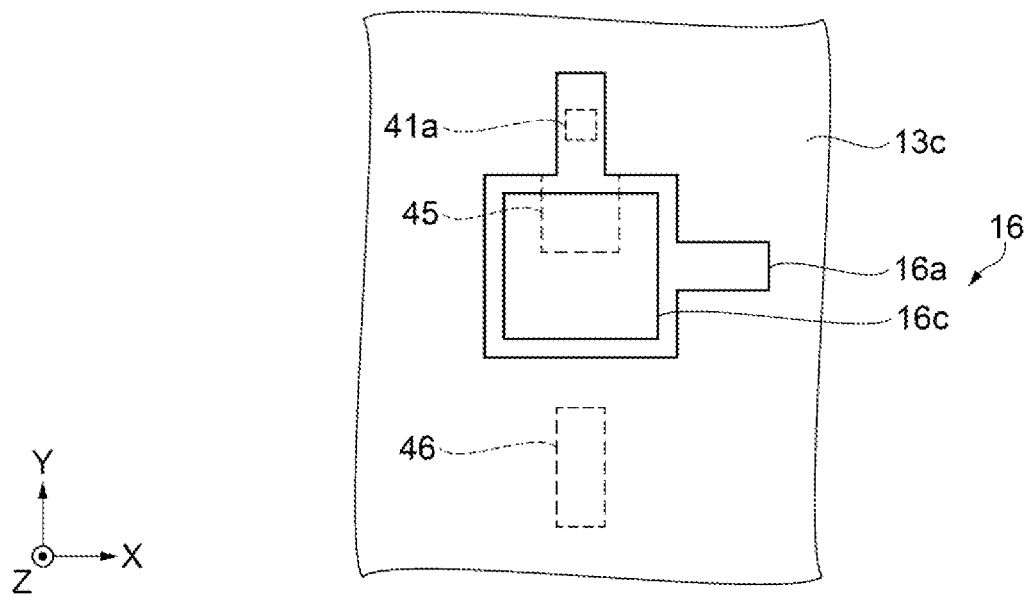
FIG. 17 is a schematic plan view illustrating a method of manufacturing an element substrate.

In the step S8, as illustrated in FIGS. 16 and 17, by performing a CMP treatment on the first conductor layer 16ax, the second insulating layer 16bx, and the second conductor layer 16cx, the capacitance element 16 including the lower capacitance electrode 16a, the capacitance insulating layer 16b, and the upper capacitance electrode 16c is collectively formed.

At this time, the first conductor layer 16ax, the second insulating layer 16bx, and the second conductor layer 16cx do not remain in the region other than the region overlapping with the first recess 51 and the second recess 52 in plan view. When the CMP treatment is performed to expose the interlayer insulating layer 13c in the peripheral region of the first recess 51 and the second recess 52 in plan view, the first conductor layer 16ax is exposed in the first recess 51 and the second conductor layer 16cx is exposed in the second recess 52. Specifically, the depth of the first recess 51 is equal to the depth of the lower capacitance electrode 16a, and the depth of the second recess 52 is equal to the total depth of the lower capacitance electrode 16a, the capacitance insulating layer 16b, and the upper capacitance electrode 16c.

As a result, the surface 16cS, on the flat surface 13cS side of the interlayer insulating layer 13c, of the upper capacitance electrode 16c in the second recess 52, the surface 16aS, on the flat surface 13cS side of the interlayer insulating layer 13c, of the lower capacitance electrode 16a in the first recess 51, and a partial surface 16bS of the capacitance insulating layer 16b, are arranged in approximately the same plane as the flat surface 13cS of the interlayer insulating layer 13c. This makes it easier to ensure electrical contact between these electrodes and the TFT 30. In addition, the number of relay electrodes is reduced, and the liquid crystal device 100 can be made thin. Then, the process proceeds to the next step.

Next, the capacitance element 16 and the interlayer insulating layer 13c are covered to form the interlayer insulating layer 13d. The interlayer insulating layer 13d is formed in the same manner as the interlayer insulating layer 13a. Although not illustrated in the drawings, a through hole that penetrates through the interlayer insulating layers 13c and 13d and reaches the relay electrode 46 is provided at a position planarly overlapping with the relay electrode 46.

Figure 18:
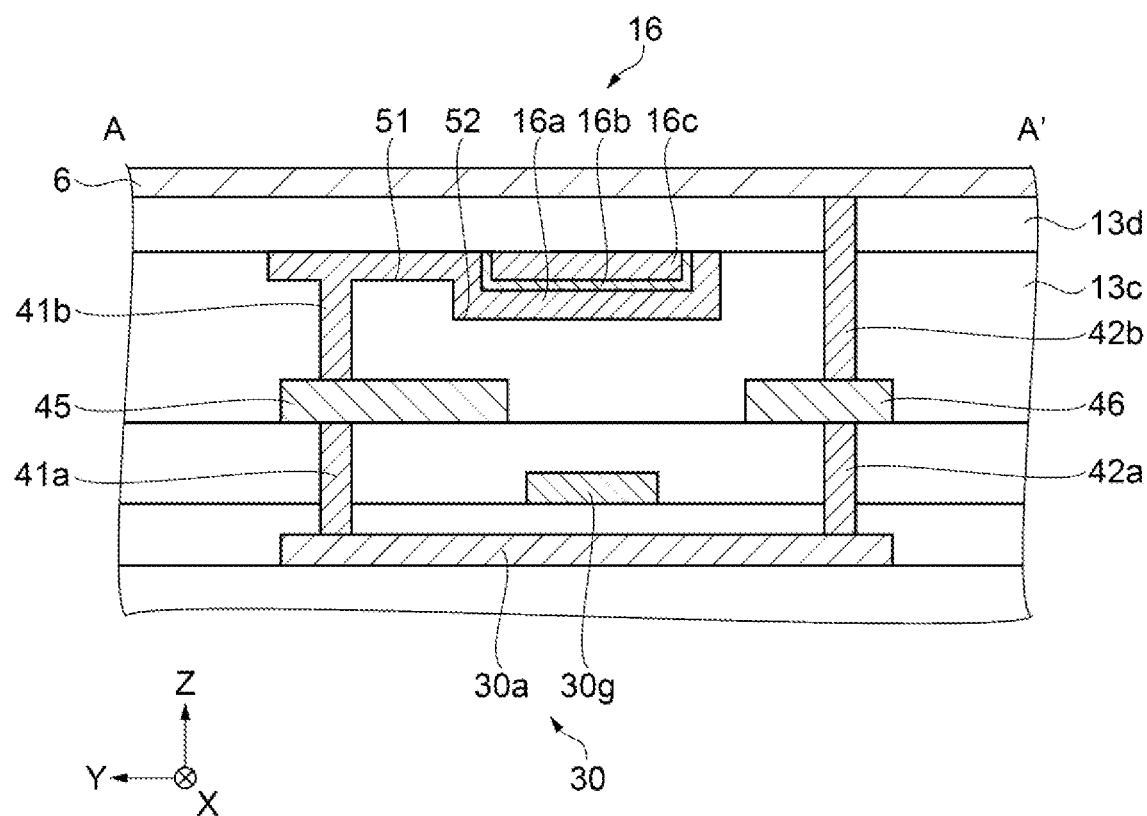
FIG. 18 is a schematic cross-sectional view illustrating a method of manufacturing an element substrate.
Figure 19:
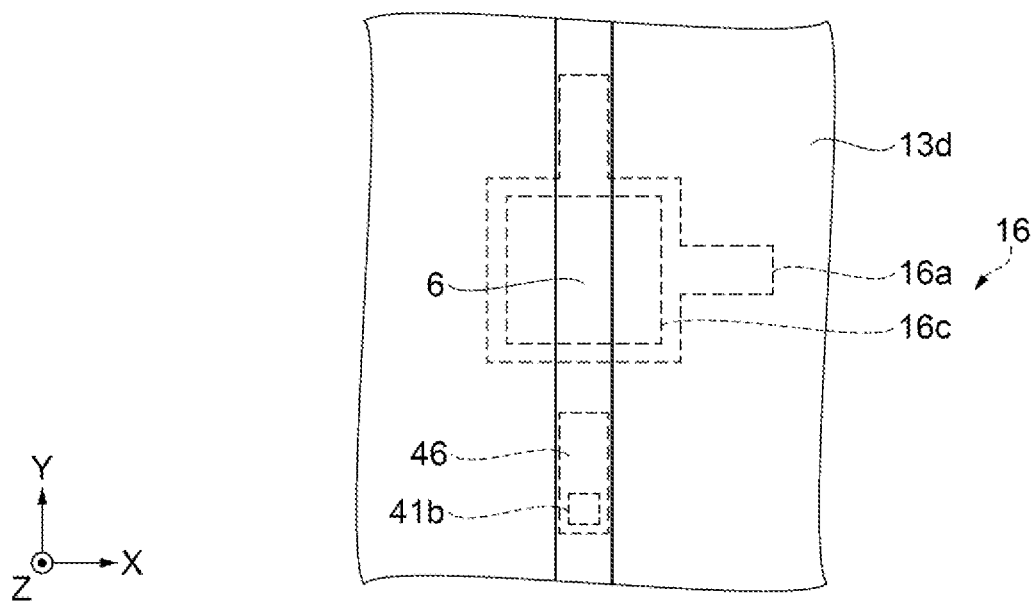
FIG. 19 is a schematic plan view illustrating a method of manufacturing an element substrate.

Next, as illustrated in FIGS. 18 and 19, the data line 6 is formed so as to overlap with the non-opening region CL in the direction along the Y-axis. Here, the capacitance element 16 has a substantially rectangular shape and is disposed at the intersection of the non-opening region CL. Although not illustrated, in this embodiment, the scanning line 3 has a substantially rectangular region similar to the capacitance element 16 at the intersection, and overlaps with the capacitance element 16 in the region. On the other hand, at the intersection, the width of the data line 6 in the direction along the X-axis is not large and is smaller than the width of the capacitance element 16 in the direction along the X-axis.

That is, the lower capacitance electrode 16a and the upper capacitance electrode 16c of the capacitance element 16 include portions that do not overlap with the data line 6 in plan view. Thus, the capacitance of the capacitance element 16 can be further increased. In addition, contacts between the lower capacitance electrode 16a and the upper capacitance electrode 16c and other wirings can be easily secured. The aperture ratio of the pixel P can be improved by suppressing the increase of the non-opening region CL. Note that the lower capacitance electrode 16a and the upper capacitance electrode 16c are not limited to including portions that do not overlap with the data line 6 in plan view, and may include portions that do not overlap with one of the data line 6 and the scanning line 3. Further, the lower capacitance electrode 16a and the upper capacitance electrode 16c may include a portion that does not overlap the data line 6 and the scanning line 3 in plan view.

Figure 20:
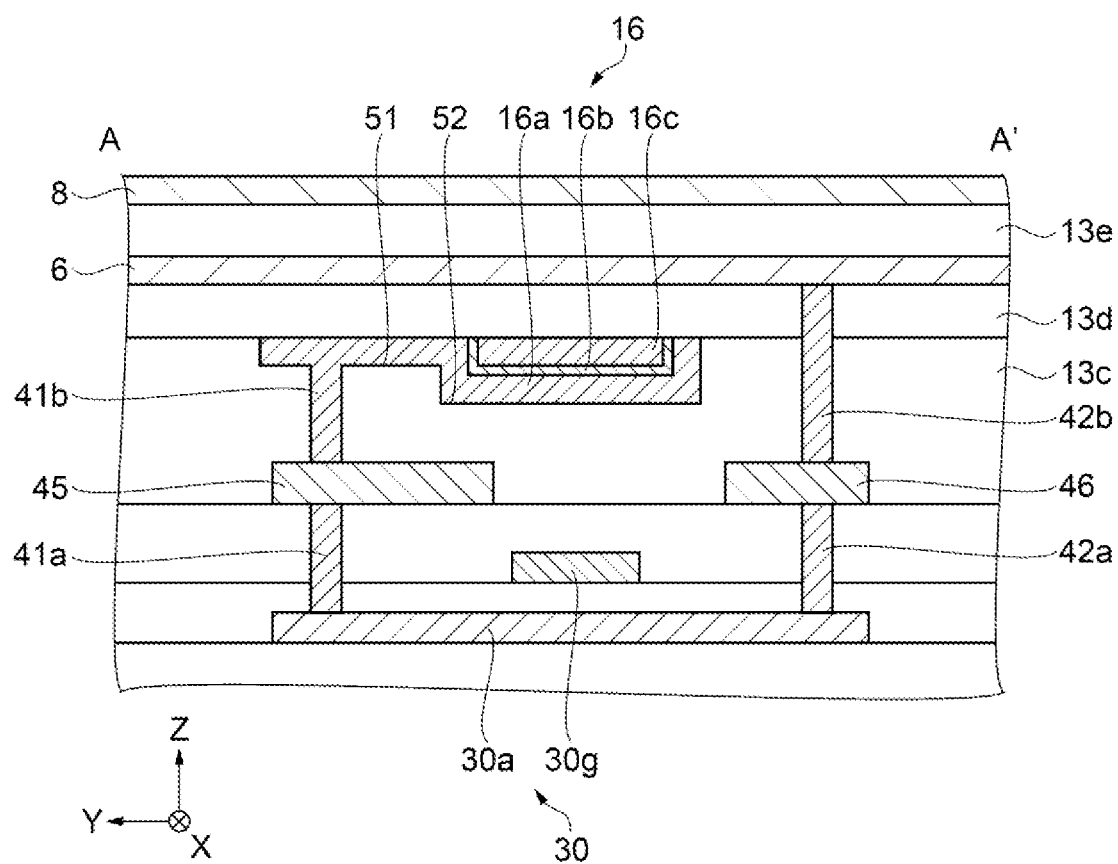
FIG. 20 is a schematic cross-sectional view illustrating a method of manufacturing an element substrate.
Figure 21:
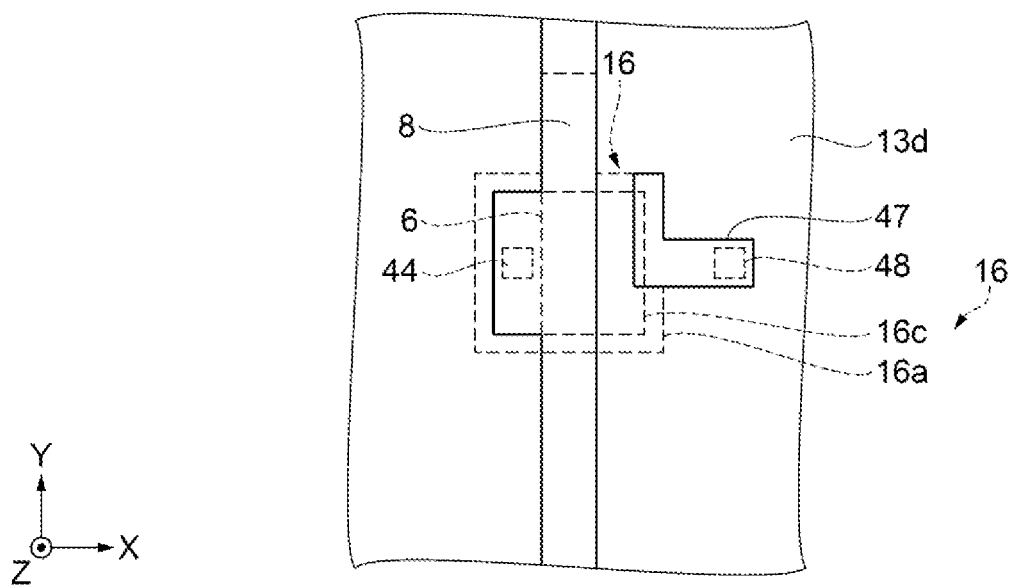
FIG. 21 is a schematic plan view illustrating a method of manufacturing an element substrate.

Next, as illustrated in FIGS. 20 and 21, the dataline 6 is covered to form the interlayer insulating layer 13e, and then the capacitance line 8 and the relay electrode 47 are formed. The interlayer insulating layer 13e is formed in the same manner as the interlayer insulating layer 13a. The capacitance line 8 includes a portion extending in the Y-axis direction and planarly overlapping with the data line 6, and a portion overlapping with the upper capacitance electrode 16c and protruding in the −X direction. A contact hole 44 for electrically coupling the upper capacitance electrode 16c and the capacitance line 8 is provided in the protruding portion.

The relay electrode 47 is provided in an island shape in the +X direction of the capacitance line 8 so as to planarly overlap with the intersection portion of the non-opening region CL and the non-opening region CL extending in the direction along the X-axis. The relay electrode 47 is electrically coupled to the lower capacitance electrode 16a through the contact hole 48.

Next, although not illustrated, after the capacitance line 8 and the relay electrode 47 are covered to form the interlayer insulating layer 13f, the pixel electrode 15 and the alignment film 18 are formed. The interlayer insulating layer 13f is formed in the same manner as the interlayer insulating layer 13a. Thus, the element substrate 10 is manufactured.

According to this embodiment, the following effects can be obtained.

The aperture ratio of the pixel P can be improved in the liquid crystal device 100. Specifically, the lower capacitance electrode 16a and the upper capacitance electrode 16c that are continuous in the capacitance element 16 are disposed in the first recess 51 and the second recess 52 having different depths. That is, when the capacitance element 16 is formed, the first recess 51 and the second recess 52 are covered with the first conductor layer 16ax serving as the lower capacitance electrode 16a, the second insulating layer 16bx serving as the capacitance insulating layer 16b, and the second conductor layer 16cx serving as the upper capacitance electrode 16c, and the CMP treatment is performed, then the capacitance element 16 is collectively formed in a self-aligned manner. Therefore, since the patterning process is not used for forming the capacitance element 16, a design margin in a planar shape of each pattern can be reduced. Accordingly, it is possible to provide the liquid crystal device 100 and the method of manufacturing the liquid crystal device 100, which improve the aperture ratio in the pixel P.

In this embodiment, the configuration of one layer or two layers is exemplified as the interlayer insulating layer 13c, but the configuration is not limited thereto. In the present disclosure, the interlayer insulating layer 13c may have a structure of three or more layers. In this embodiment, the capacitance element 16 is disposed in the insulating layer between the data line 6 and the transistor 30, but is not limited thereto. According to an aspect of the present disclosure, the capacitance element 16 may be disposed in the second recess 52 by providing the first recess 51 and the second recess 52 in the insulating layer between the data line and the pixel electrode 15. Alternatively, the capacitance element 16 may be disposed in the second recess 52 by providing the first recess 51 and the second recess 52 in the insulating layer between the substrate 10s and the transistor 30. Alternatively, the first recess 51 and the second recess 52 may be formed in the substrate 10s, and the capacitance element 16 may be provided in the second recess 52.

2. Second Embodiment

In this embodiment, an active drive type liquid crystal device including a TFT is exemplified as the electro-optical device. The liquid crystal device according to this embodiment differs from the liquid crystal device 100 of the first embodiment in the configuration of the element substrate. In the following description, the same components as those in the first embodiment are denoted by the same reference numerals, and redundant description thereof will be omitted.

Figure 22:
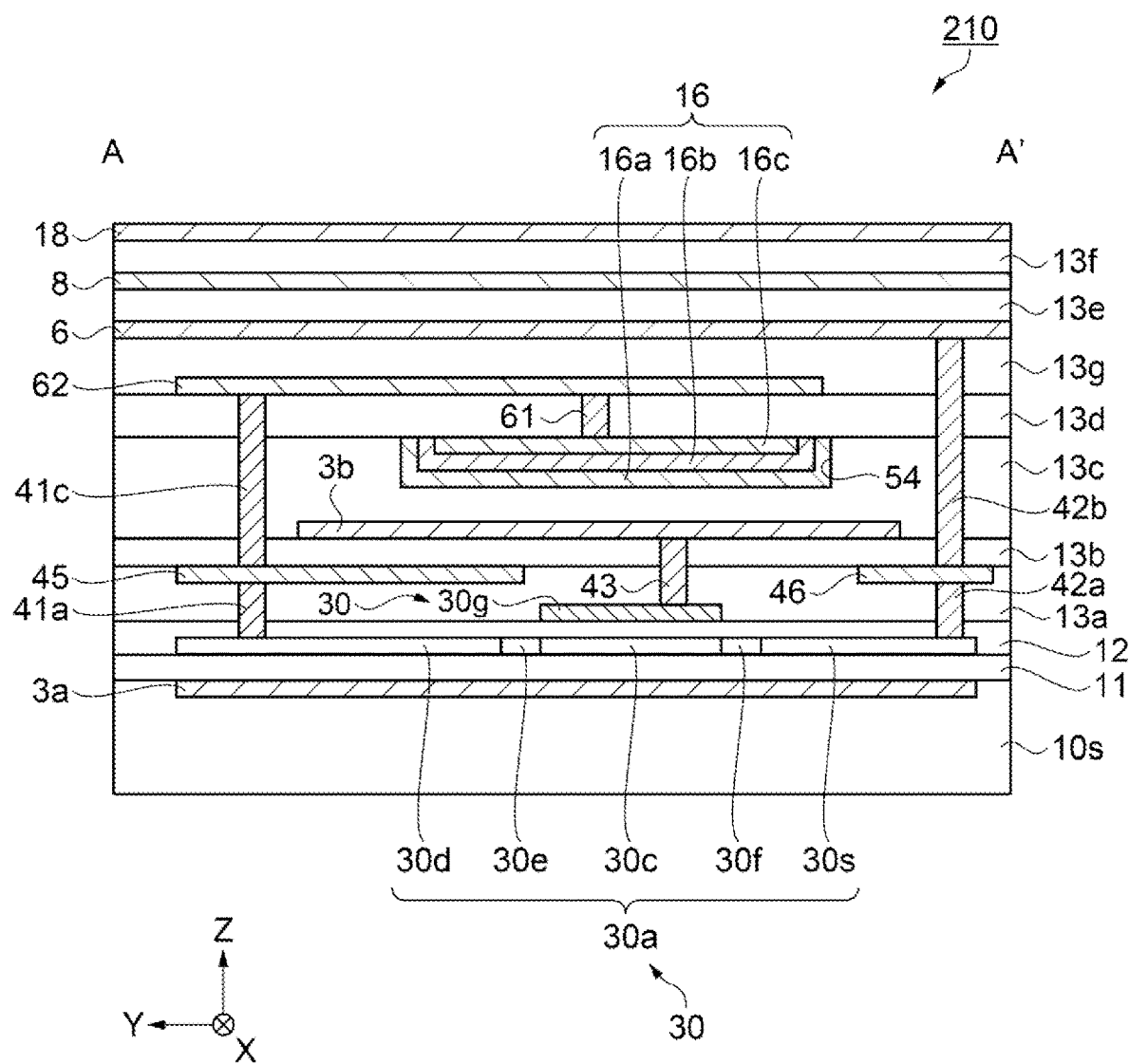
FIG. 22 is an enlarged cross-sectional view illustrating a detailed configuration of the liquid crystal device according to a second embodiment.
Figure 23:
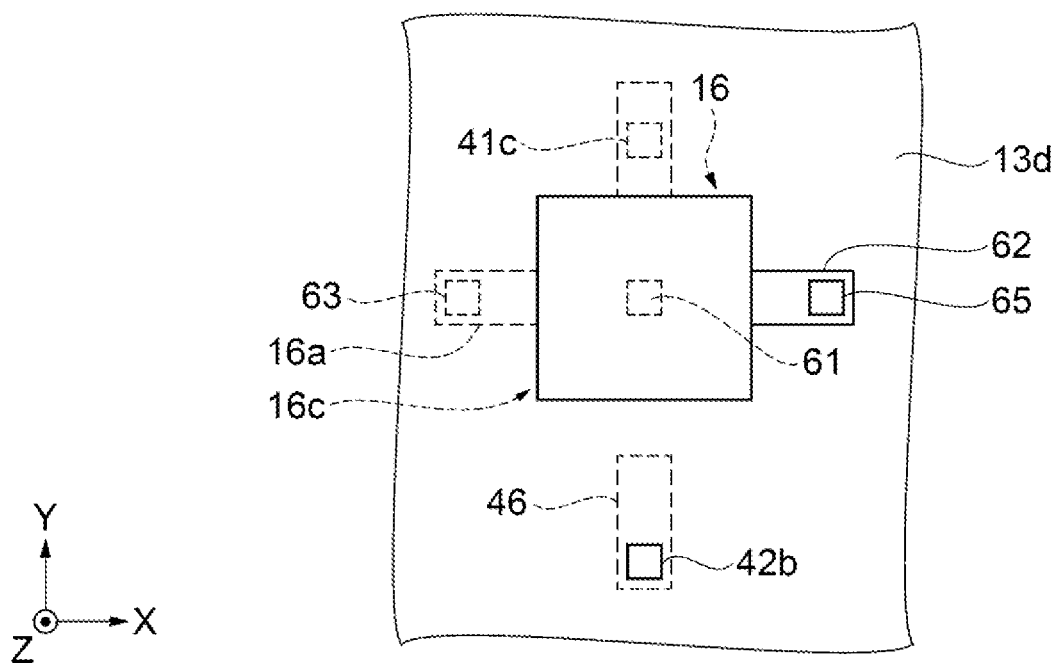
FIG. 23 is a schematic plan view illustrating a method of manufacturing an element substrate.
Figure 24:
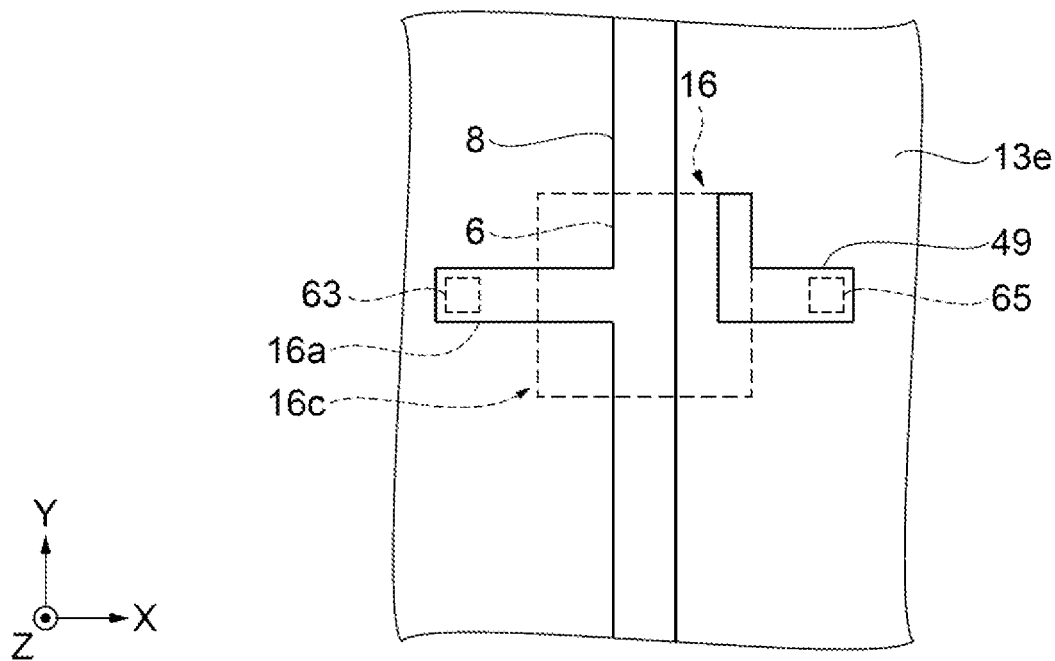
FIG. 24 is a schematic plan view illustrating a method of manufacturing an element substrate.

The structure of the element substrate 210 included in the liquid crystal device of this embodiment will be described with reference to FIGS. 22, 23, and 24. FIG. 22 illustrates a portion, in the element substrate 210 of the second embodiment, corresponding to FIG. 5 of the first embodiment. In FIGS. 23 and 24, a region corresponding to the region F illustrated in FIG. 4 of the first embodiment is illustrated in an enlarged manner. In the description of the schematic plan view, a state in plan view is described unless otherwise specified.

As illustrated in FIG. 22, in the element substrate 210, the upper capacitance electrode 16c of the capacitance element 16 is electrically coupled to the high concentration impurity region 30d of the semiconductor layer 30a via the contact hole 61, the relay electrode 62, the contact hole 41c, the relay electrode 45, and the contact hole 41a.

As illustrated in FIG. 23, the lower capacitance electrode 16a of the capacitance element 16 includes a contact hole 63 in a portion protruding in the −X direction from the rectangular main body portion. As illustrated in FIG. 24, the contact hole 63 is electrically coupled to the capacitance line 8 through the contact hole 63 penetrating the upper interlayer insulating layers 13d, 13g, and 13e. As described above, in the capacitance element 16 of this embodiment, the common potential is applied to the lower capacitance electrode 16a that is the first capacitance electrode. The element substrate 210 is different from the element substrate 10 of the first embodiment in this point. Hereinafter, differences in the accompanying configuration will be described.

As illustrated in FIGS. 23 and 24, since the contact hole 63 is disposed in the lower capacitance electrode 16a, the planar shape of the contact hole 63 is different from that of the first embodiment. That is, the first recess (not illustrated) for forming the lower capacitance electrode 16a also has a different planar shape. The capacitance line 8 has a region protruding in the −X direction from a portion extending along the Y-axis in the non-opening region CL (not illustrated), and is electrically coupled to the contact hole 63 in the region.

The relay electrode 62 has a portion protruding in the +Y direction and a portion protruding in the +X direction. The contact hole 41c from below is electrically coupled to the portion protruding in the +Y direction. The contact hole 65 extending upward is electrically coupled to the portion protruding in the +X direction.

A relay electrode 49 is formed in the same layer as the capacitance line 8. The relay electrode 49 is electrically coupled to the contact hole 65 from below. Although not illustrated, the relay electrode 49 is electrically coupled to the pixel electrode 15 via a contact hole extending upward, or the like.

For the element substrate 210, the same forming material and manufacturing method as those of the element substrate 10 of the first embodiment are adopted except that the forms such as the first recess and the second recess are different in accordance with the configuration of the capacitance element 16.

According to this embodiment, the same effects as those of the first embodiment can be obtained.

3. Third Embodiment

In this embodiment, an active drive type liquid crystal device including a TFT is exemplified as the electro-optical device. The liquid crystal device according to this embodiment differs from the liquid crystal device 100 of the first embodiment in a part of the configuration and a part of the manufacturing process. Specifically, this embodiment is different from the first embodiment in that the interlayer insulating layer 13c has a two layer structure including the interlayer insulating layer 13c1 and the interlayer insulating layer 13c2, and an etching stopper layer is provided between the interlayer insulating layer 13c1 and the interlayer insulating layer 13c2. Therefore, in the following description, the same components as those in the first embodiment are denoted by the same reference numerals, and redundant description thereof will be omitted.

Figure 25:
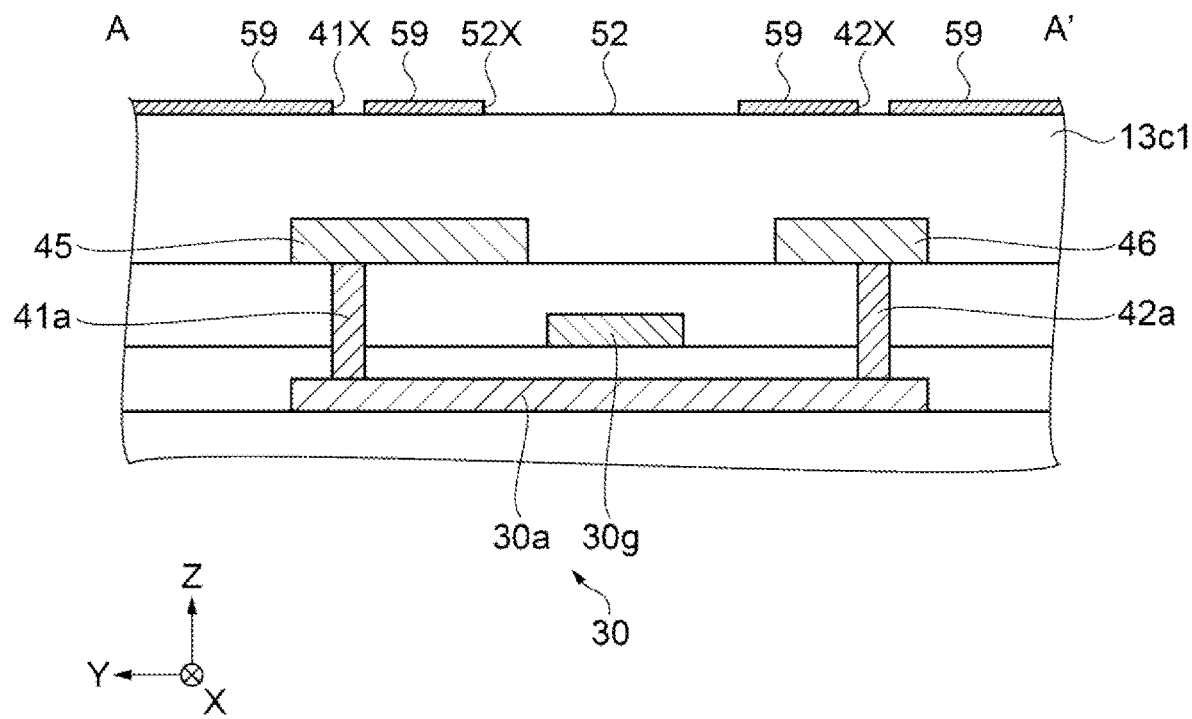
FIG. 25 is a schematic cross-sectional view illustrating a method of manufacturing an element substrate according to a third embodiment.
Figure 26:
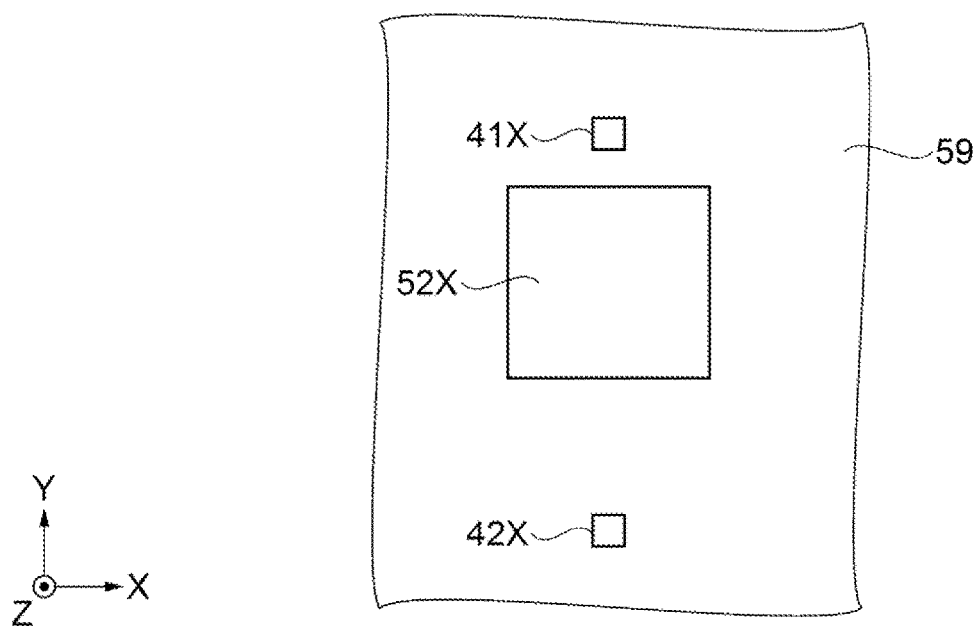
FIG. 26 is a schematic plan view illustrating a method of manufacturing an element substrate.
Figure 27:
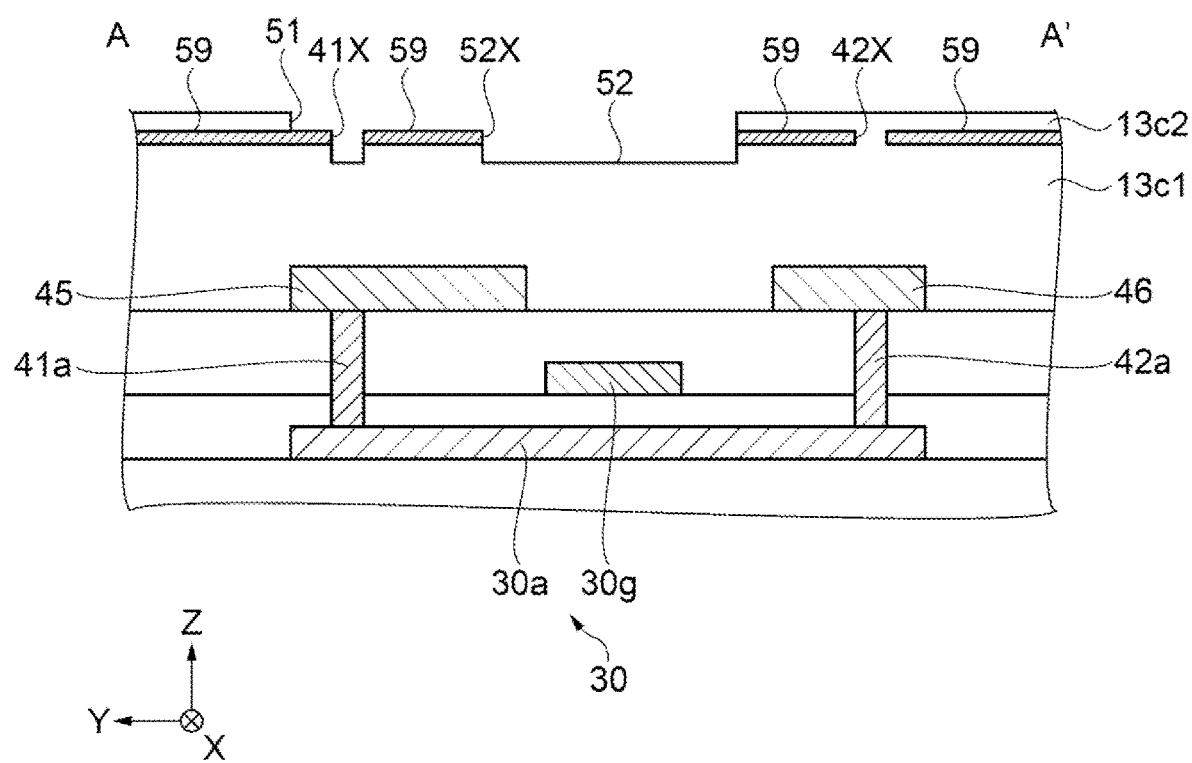
FIG. 27 is a schematic cross-sectional view illustrating a method of manufacturing an element substrate.

The manufacturing method of this embodiment will be described with reference to FIGS. 25 to 27. FIGS. 25 and 27 illustrate regions corresponding to FIG. 7 or the like of the first embodiment, and illustrations of the substrate 10s, the first scanning line 3a, and the second scanning line 3b, or the like are omitted. FIG. 26 is an enlarged view of a region corresponding to the region F illustrated in FIG. 4 of the first embodiment. In the description of FIG. 26, a state in plan view is described unless otherwise specified.

As illustrated in FIG. 25, a second scanning line 3b (not illustrated) is covered to form an interlayer insulating layer 13c1. Materials and methods of forming the interlayer insulating layer 13c1 are the same as those of forming the interlayer insulating layer 13c in the first embodiment. The thickness of the interlayer insulating layer 13c1 is not particularly limited, but is, for example, from 400 nm to 800 nm. Then, the interlayer insulating layer 13c1 is covered to form an etching stopper layer 59. The etching stopper layer 59 is made of silicon nitride. The thickness of the etching stopper layer 59 is not particularly limited, but is, for example, from 30 nm to 50 nm.

Openings 41X, 52X, and 42X are provided in the etching stopper layer 59. As illustrated in FIG. 26, each of the openings 41X, 52X, and 42X has a rectangular shape. In subsequent steps, a through hole is formed to form the tungsten plug 41b via the opening 41X. In subsequent steps, the second recess 52 is formed via the opening 52X. In subsequent steps, a through hole is formed to form the contact hole 42b via the opening 42x. The etching stopper layer 59 having the openings 41X, 52X, and 42X can be formed by known methods.

Then, the etching stopper layer 59 is covered to form an interlayer insulating layer 13c2. Materials and methods of forming the interlayer insulating layer 13c2 are the same as those of the interlayer insulating layer 13c1. The thickness of the interlayer insulating layer 13c2 is not particularly limited, but is, for example, from 100 nm to 200 nm. The first insulating layer in this embodiment is the interlayer insulating layers 13c1 and 13c2.

Next, the first recess 51 is formed in the interlayer insulating layers 13c1 and 13c2. The form and formation method of the first recess 51 are the same as those of the first embodiment.

Next, as illustrated in FIG. 27, the second recess 52 is formed in the interlayer insulating layer 13c1. At this time, since the opening 52X corresponding to the planar shape and position of the second recess 52 is disposed in the etching stopper layer 59, the second recess 52 can be easily formed. That is, the etching stopper layer 59 is disposed on the bottom surface of the first recess 51, and the etching stopper layer 59 is not disposed on the bottom surface of the second recess 52.

According to this embodiment, the following effects can be obtained in addition to the effects of the first embodiment. The first recess 51 and the second recess 52 having different depths can be easily formed by the etching stopper layer 59.

4. Fourth Embodiment

A projection-type display device 1000 is exemplified as an electronic apparatus according to this embodiment.

Figure 28:
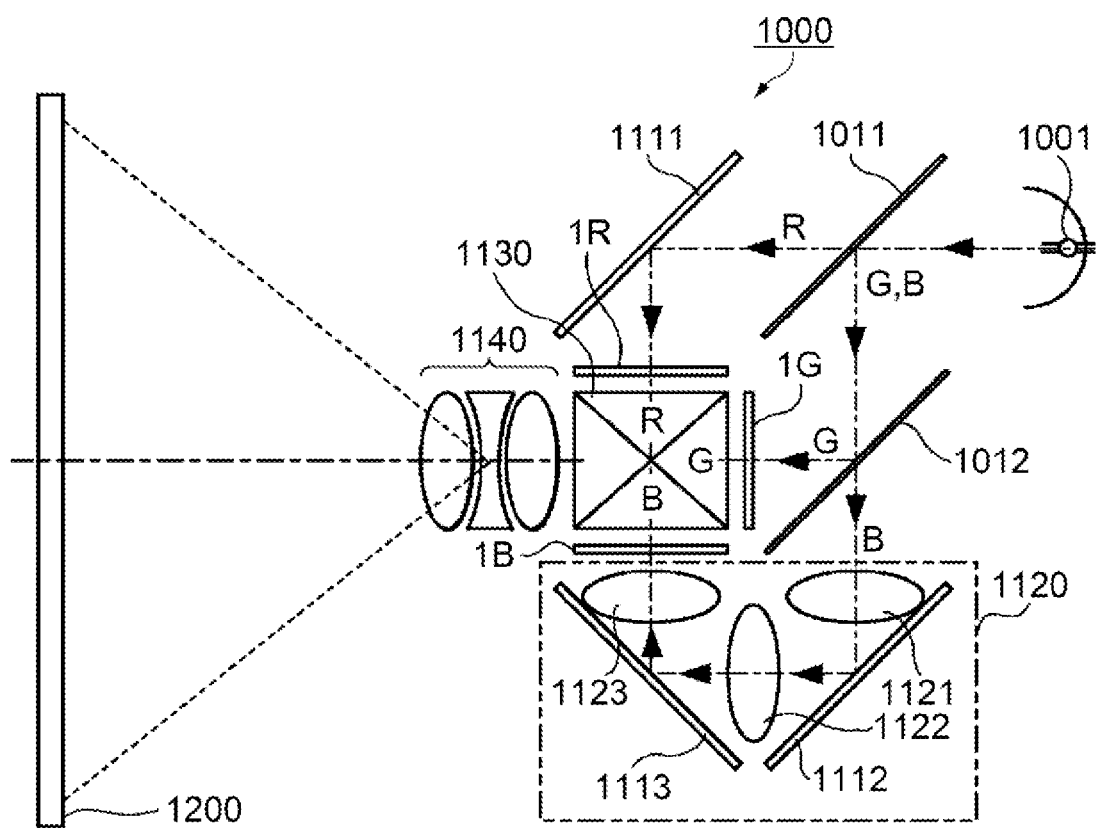
FIG. 28 is a schematic view illustrating a configuration of a projection-type display apparatus as an electronic apparatus according to a fourth embodiment.

As illustrated in FIG. 28, the projection-type display device 1000 includes a lamp unit 1001, dichroic mirrors 1011, 1012 of a color separation optical system, three liquid crystal devices 1B, 1G, and 1R, reflection mirrors 1111, 1112, and 1113, relay lenses 1121, 1122, and 1123, a dichroic prism 1130 of a color synthesis optical system, and a projection lens 1140 of a projection optical system.

The lamp unit 1001 is, for example, a discharge type light source. The type of the light source is not limited thereto, and a solid-state light source such as a light emitting diode or a laser may be employed.

The light emitted from the lamp unit 1001 is separated by the dichroic mirrors 1011, 1012 into three color lights having different wavelength ranges. The three color lights are red light R of substantially red color, green light G of substantially green color, and blue light B of substantially blue color.

The dichroic mirror 1011 transmits the red light R and reflects the green light G and the blue light B having a shorter wavelength than the red light R. The red light R transmitted through the dichroic mirror 1011 is reflected by the reflection mirror 1111 and enters the liquid crystal device 1R. The green light G reflected by the dichroic mirror 1011 is reflected by the dichroic mirror 1012, then enters the liquid crystal device 1G. The blue light B reflected by the dichroic mirror 1011 transmits through the dichroic mirror 1012 and enters the relay lens system 1120.

The relay lens system 1120 includes relay lenses 1121, 1122, 1123, and reflection mirrors 1112, 1113. Since the optical path of the blue light B is longer than those of the green light G and the red light R, the light beam of the blue light B tends to increase. Therefore, the relay lens 1122 is used to suppress the enlargement of the light beam. The blue light B incident on the relay lens system 1120 is reflected by the reflection mirror 1112 while being converged by the relay lens 1121, and is converged near the relay lens 1122. Then, the blue light B enters the liquid crystal device 1B via the reflection mirror 1113 and the relay lens 1123.

The liquid crystal device as the electro-optical device according to the above-described embodiment is applied to the liquid crystal devices 1R, 1G, and 1B as the light modulation devices in the projection-type display device 1000. The liquid crystal device of the above embodiment may be applied to one or more of the liquid crystal devices 1R, 1G, and 1B, and is more preferably applied to all of them.

Each of the liquid crystal devices 1R, 1G, and 1B is electrically coupled to an upper circuit of the projection-type display device 1000. Therefore, when the image signals specifying the gradation levels of the red, green, and blue lights R, G, and B are supplied from the external circuit to the upper circuit and processed, the liquid crystal devices 1R, 1G, and 1B are driven to modulate the color lights respectively.

The red, green, and blue lights R, G, and B modulated by the liquid crystal devices 1R, 1G, and 1B respectively enter the dichroic prism 1130 from three directions. The dichroic prism 1130 combines the incident red light R, green light G, and blue light B. In the dichroic prism 1130, the red light R and the blue light B are reflected at 90 degrees, and the green light G is transmitted. Thus, the red light R, the green light G, and the blue light B are combined as display light for displaying a color image and enter the projection lens 1140.

The projection lens 1140 is disposed to face the outside of the projection-type display device 1000. The display light is enlarged and emitted through the projection lens 1140, and a projection image is projected on the screen 1200 that is a projection target.

In this embodiment, the projection-type display device 1000 is exemplified as the electronic apparatus, but the present disclosure is not limited thereto. The liquid crystal device of the present disclosure may be applied to an electronic apparatus such as a HUD (Head-Up Display), a direct-view-type HMD (Head Mounted Display), a personal computer, a digital camera, or a liquid crystal television.

According to this embodiment, the aperture ratio of the pixel P in the liquid crystal devices 1R, 1G, and 1B is improved. Therefore, it is possible to provide the projection-type display device 1000 in which the brightness of the projection image is more excellent than in the related art.

What is claimed is:

1. An electro-optical device comprising:
   an insulating layer including a first recess and a second recess that is provided continuously with the first recess and is deeper than the first recess; and
   a capacitance element including, a first capacitance electrode provided along a bottom surface of the second recess and a side wall of the second recess and provided along a bottom surface of the first recess, a capacitance insulating layer stacked on the first capacitance electrode, and a second capacitance electrode stacked on the capacitance insulating layer; wherein
   an upper surface of the second capacitance electrode at a position overlapping with the second recess, an upper surface of the first capacitance electrode at a position overlapping with the first recess, and a part of the capacitance insulating layer, are provided on the same surface as an upper surface of the insulating layer.

2. The electro-optical device according to claim 1, comprising:
   a data line; and
   a scanning line, wherein
   the capacitance element is disposed at a position overlapping with a region where the data line and the scanning line intersect with each other in plan view.

3. The electro-optical device according to claim 2, wherein
   the first capacitance electrode and the second capacitance electrode include a portion that does not overlap with the data line and the scanning line in plan view.

4. The electro-optical device according to claim 2, wherein
   the first capacitance electrode and the second capacitance electrode include a portion that does not overlap with one of the data line and the scanning line in plan view.

5. The electro-optical device according to claim 1, comprising a transistor, wherein
   the first capacitance electrode is electrically coupled to the transistor through a first contact hole provided in the first recess of the insulating layer.

6. The electro-optical device according to claim 1, comprising a capacitance line, wherein
   the second capacitance electrode is electrically coupled to the capacitance line through a second contact hole.

7. The electro-optical device according to claim 1, wherein
   the first capacitance electrode and the second capacitance electrode contain tungsten.

8. The electro-optical device according to claim 1, wherein
   an etching stopper layer is disposed along the bottom surface of the first recess, and the etching stopper layer is not disposed at a position overlapping with the bottom surface of the second recess.

9. The electro-optical device according to claim 1, wherein
   a depth of the first recess is equal to a thickness of the first capacitance electrode, and
   a depth of the second recess is equal to a total thickness of the first capacitance electrode, the capacitance insulating layer, and the second capacitance electrode.

10. The electro-optical device according to claim 1, wherein
    an adhesive layer is disposed between the first capacitance electrode and the insulating layer.

11. An electronic apparatus comprising the electro-optical device according to claim 1.

\* \* \* \* \*